(12) United States Patent
Yamazaki et al.

(10) Patent No.: US 12,001,519 B2
(45) Date of Patent: Jun. 4, 2024

(54) OBJECT CLASSIFICATION AND RELATED APPLICATIONS BASED ON FRAME AND EVENT CAMERA PROCESSING

(71) Applicant: SONY GROUP CORPORATION, Minato-ku (JP)

(72) Inventors: Ted Yamazaki, San Diego, CA (US);
Tonni Larsen, San Diego, CA (US);
Leigh Anderson, Novi, MI (US);
Tatsushi Nashida, Kanagawa (JP);
Naomasa Takahashi, Chiba (JP)

(73) Assignee: SONY GROUP CORPORATION, Tokyo (JP)

( * ) Notice: Subject to any disclaimer, the term of this patent is extended or adjusted under 35 U.S.C. 154(b) by 548 days.

(21) Appl. No.: 17/177,933

(22) Filed: Feb. 17, 2021

(65) Prior Publication Data

US 2022/0114379 A1   Apr. 14, 2022

Related U.S. Application Data

(60) Provisional application No. 63/089,413, filed on Oct. 8, 2020, provisional application No. 63/090,773, filed on Oct. 13, 2020.

(51) Int. Cl.
*G06F 18/2413* (2023.01)
*B60K 35/00* (2006.01)
(Continued)

(52) U.S. Cl.
CPC .......... *G06F 18/2413* (2023.01); *B60K 35/00* (2013.01); *B60W 30/09* (2013.01);
(Continued)

(58) Field of Classification Search
CPC .... G06F 18/24; G06F 18/241; G06F 18/2413; G06N 20/00; B60W 60/00;
(Continued)

(56) References Cited

U.S. PATENT DOCUMENTS

| 9,218,698 B2 | 12/2015 | Ricci |
| 9,563,199 B1 * | 2/2017 | Ferguson .............. B60W 40/04 |

(Continued)

FOREIGN PATENT DOCUMENTS

| CN | 109426782 A | 3/2019 |
| JP | 2015184975 A | 10/2015 |

(Continued)

OTHER PUBLICATIONS

International Search Report and Written Opinion of PCT Application No. PCT/IB2021/059215, dated Feb. 8, 2022, 06 pages of ISRWO.

(Continued)

*Primary Examiner* — John Villecco
*Assistant Examiner* — Courtney Joan Nelson
(74) *Attorney, Agent, or Firm* — CHIP LAW GROUP

(57) ABSTRACT

A system and method for object classification and related applications based on frame and event camera processing is provided. The system acquires an output of image sensor circuitry and determines a first object classification result based on feature points associated with first objects in a first frame of the acquired output. The system executes an event-camera signal processing operation on at least two frames of the acquired output to generate an event frame. The generated event frame includes pixel-level movement information associated with second objects. The system determines a second object classification result based on the pixel-level movement information and determines one or more object classification tags based on the determined first and the determined second object classification result. The determined one or more object classification tags correspond to one or more objects, included in at least the first objects and the second objects.

18 Claims, 14 Drawing Sheets

(51) Int. Cl.
| | |
|---|---|
| *B60K 35/10* | (2024.01) |
| *B60W 30/09* | (2012.01) |
| *G06N 20/00* | (2019.01) |
| *G06V 10/44* | (2022.01) |
| *G06V 10/75* | (2022.01) |
| *G06V 20/58* | (2022.01) |

(52) U.S. Cl.
CPC .......... *G06N 20/00* (2019.01); *G06V 10/443* (2022.01); *G06V 10/751* (2022.01); *G06V 20/58* (2022.01); *B60K 35/10* (2024.01); *B60K 2360/146* (2024.01); *B60K 2360/334* (2024.01); *B60W 2400/00* (2013.01); *B60W 2420/403* (2013.01)

(58) Field of Classification Search
CPC ......... B60W 60/0011; B60W 60/0027; B60W 30/09; B60W 2400/00; B60W 2420/403; G06V 10/764; G06V 20/44; G06V 40/172; G06V 10/761; G06V 10/757; G06V 10/20; G06V 20/54; G06V 20/56; G06V 2201/06; G06V 40/1365; G06V 30/19; G06V 10/443; G06V 20/58; G06V 10/751; G06T 7/20; G06T 7/246; G06T 7/00; G06T 2207/30236; G06T 2210/12; B60K 35/00; B60K 2360/146; B60K 35/10; B60K 2360/334

See application file for complete search history.

(56) References Cited

U.S. PATENT DOCUMENTS

| | | | |
|---|---|---|---|
| 10,467,488 | B2 | 11/2019 | Sicconi et al. |
| 10,468,062 | B1* | 11/2019 | Levinson ............. G06V 10/811 |
| 10,769,480 | B2* | 9/2020 | Li ........................... G06V 20/46 |
| 2018/0336424 | A1* | 11/2018 | Jang ..................... G06V 10/454 |
| 2019/0065885 | A1 | 2/2019 | Li et al. |
| 2020/0057546 | A1 | 2/2020 | Zhao et al. |
| 2020/0184233 | A1* | 6/2020 | Berberian ............ G06V 20/588 |

FOREIGN PATENT DOCUMENTS

| | | |
|---|---|---|
| JP | 2019091102 A | 6/2019 |
| KR | 10-2019-0024689 A | 3/2019 |

OTHER PUBLICATIONS

Gao, et al., "An End-to-End Broad Learning System for Event-Based Object Classification", IEEE Access, vol. 8, XP011777720, Mar. 3, 2020, pp. 45974-45984.

Gao, et al., "Event-Based Incremental Broad Learning System for Object Classification", IEEE/CVF, International Conference on Computer Vision Workshop, XP033732631, Oct. 27, 2019, pp. 2989-2998.

Gallego, et al., "Event-based Vision: A Survey", Computer Science, Computer Vision and Pattern Recognition, Cornell University, XP081735140, Aug. 8, 2020, 30 pages.

Liuhongjie, et al., "Combined frame-and event-based detection and tracking", IEEE International Symposium on Circuits and Systems, XP032942109, May 22, 2016, pp. 2511-2514.

Hu, et al., "DDD20 End-to-End Event Camera Driving Dataset: Fusing Frames and Events with Deep Learning for Improved Steering Prediction", Computer Science, Computer Vision and Pattern Recognition, Cornell University, XP081671841, May 18, 2020, 6 pages.

* cited by examiner

OBJECT CLASSIFICATION AND RELATED APPLICATIONS BASED ON FRAME AND EVENT CAMERA PROCESSING

CROSS REFERENCE TO RELATED APPLICATIONS

This application claims priority to U.S. Provisional Patent Application Ser. No. 63/089,413 filed on Oct. 8, 2020 and U.S. Provisional Patent Application Ser. No. 63/090,773 filed on Oct. 13, 2020, the entire content of which is hereby incorporated herein by reference.

FIELD

Various embodiments of the disclosure relate to image and event camera processing. More specifically, various embodiments of the disclosure relate to a system and method for object classification and related applications based on frame and event camera processing.

BACKGROUND

Advancements in image processing have led to the development of various image processing devices and techniques that may utilize captured images for object detection and classification. In many instances, there may be few objects in images which a conventional image processing device, such as a frame-based camera, may mis-detect, or may detect but may misclassify. Inaccuracy in object detection or classification may be unacceptable in several applications, especially ones which take critical decisions or actions based on object detection or classification.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for object classification and related applications based on frame and event camera processing is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in a disclosed system and method for object classification and related applications based on frame and event camera processing. Exemplary aspects of the disclosure provide a system for object classification based on frame and event camera processing. The system may be implemented on, for example, an imaging device, a smartphone, an edge computing device, a vehicle, an Internet of things (IOT) device, passenger drone and the like.

At any time-instant, the system may be configured to acquire an output of image sensor circuitry and determine object classification tags based on frame and event camera processing. The system may be configured to determine a first object classification result based on feature points associated with one or more first objects (such as objects that may be in stationary state or may be about to reach a stationary state) in a first frame of the acquired output. Also, the system may determine a second object classification result based on execution of an event-camera signal processing operation on at least two frames of the acquired output to generate an event frame. The generated event frame may include pixel-level movement information associated with one or more second objects (such as objects that may be in motion). Based on the determined first object classification result and the determined second object classification result, the system may be configured to determine one or more object classification tags corresponding to one or more objects, which may be included in at least the first object(s) and the second object(s). By execution of frame and event camera processing, the disclosed system may be able to robustly detect and classify object(s), some of which may be mis-detected and/or mis-classified by typical frame-based object detection/classification methods.

Figure 1:
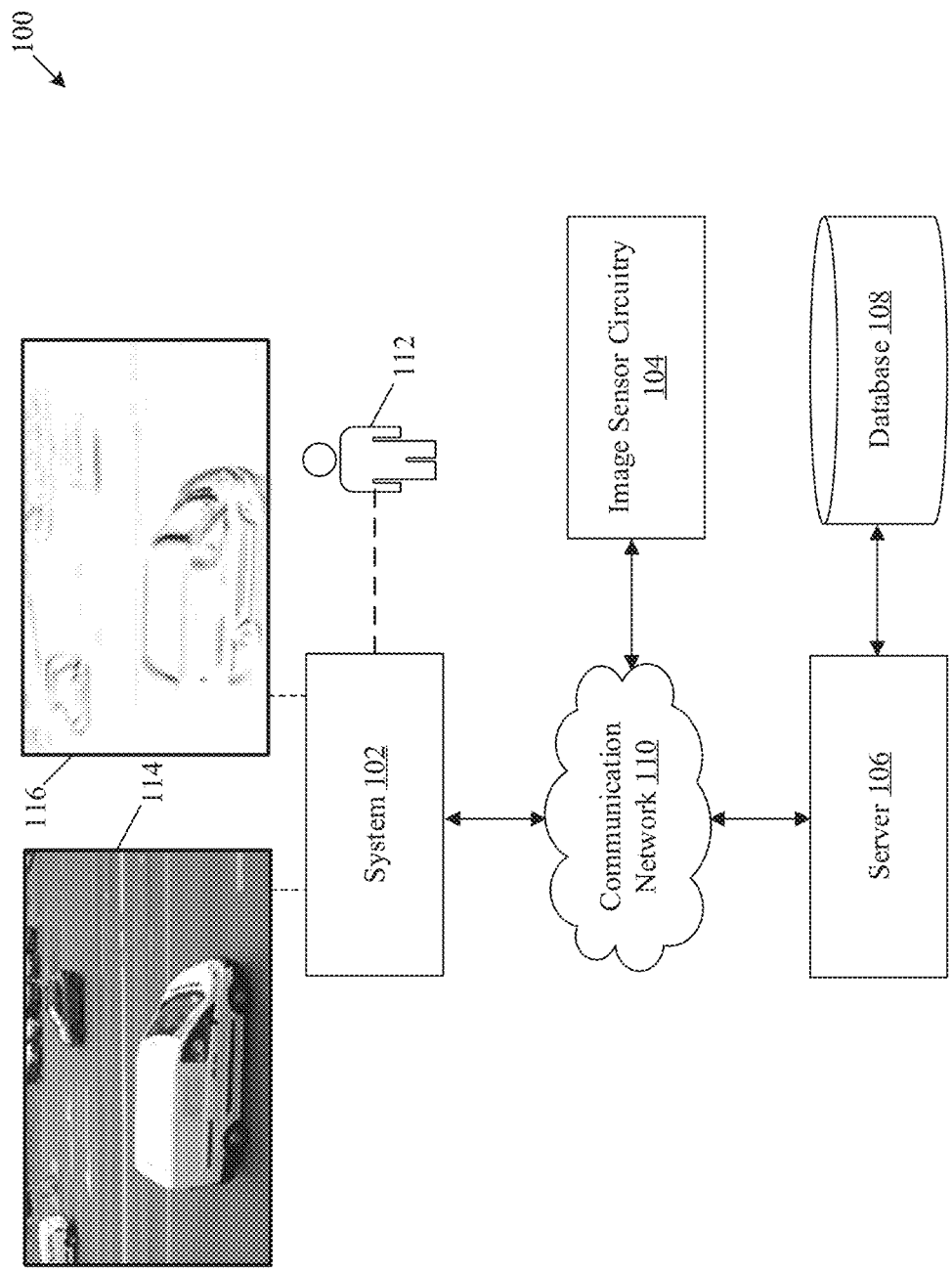
FIG. 1 is a block diagram that illustrates an exemplary environment for object classification based on frame and event camera processing, in accordance with an embodiment of the disclosure.

FIG. 1 is a block diagram that illustrates an exemplary environment for object classification based on frame and event camera processing, in accordance with an embodiment of the disclosure. With reference to FIG. 1, there is shown a diagram of a network environment 100. The network environment 100 may include a system 102, image sensor circuitry 104, a server 106, and a database 108. The system 102 may be coupled to the image sensor circuitry 104 and the server 106, via a communication network 110. There is further shown a user 112 who may be associated with the system 102.

The system 102 may include suitable logic, circuitry, code, and/or interfaces that may be configured to acquire an output of the image sensor circuitry 104. The system 102 may determine object classification result(s) based on execution of frame and event-camera signal processing on the acquired output. Example implementations of the system 102 may include, but are not limited to, one or more of an imaging device (such as a camera), a vehicle Electronic Control Unit (ECU), a smartphone, a cellular phone, a mobile phone, a wearable or head-mounted electronic device (for example, an eXtended Reality (XR) headset), a gaming device, a mainframe machine, a server, a computer workstation, an edge computing device, a passenger drone support system, a consumer electronic (CE) device, or any computing device with an image processing capability.

The image sensor circuitry 104 may include suitable logic, circuitry, and/or interfaces that may be configured to acquire image signals based on light signals which may be incident on the image sensor circuitry 104. The acquired image signals may correspond to one or more frames of a scene in a field-of-view (FOV) of an imaging unit which includes the image sensor circuitry 104. The image sensor circuitry 104 may include the acquired image signals in its output. In an embodiment, the acquired image signals may be raw image data in Bayer space. The imaging unit may be a camera device, separate from or integrated into the system 102. Examples of the image sensor circuitry 104 may include, but are not limited to, a passive pixel sensor, an active pixel sensor, a semiconductor charged coupled device (CCD) based image sensor, a Complementary metal-oxide-semiconductor (CMOS)-based image sensor, a backlit CMOS sensor with a global shutter, a Silicon-on-Insulator (SOI)-based single-chip image sensor, an N-type metal-oxide-semiconductor based image sensor, a flat panel detector, or other variants of an image sensor.

The server 106 may include suitable logic, circuitry, and interfaces, and/or code that may be configured to detect and/or classify one or more objects in image(s) and/or event frame(s). The server 106 may include a database (such as the database 108) for pattern matching and trained Artificial Intelligence (AI), machine learning, or deep learning models to correctly detect and/or classify object(s) in the frame(s). In an exemplary embodiment, the server 106 may be implemented as a cloud server and may execute operations through web applications, cloud applications, HTTP requests, repository operations, file transfer, and the like. Other example implementations of the server 106 may include, but are not limited to, a database server, a file server, a web server, a media server, an application server, a mainframe server, or a cloud computing server.

In at least one embodiment, the server 106 may be implemented as a plurality of distributed cloud-based resources by use of several technologies that are well known to those ordinarily skilled in the art. A person with ordinary skill in the art will understand that the scope of the disclosure may not be limited to the implementation of the server 106 and the system 102 as two separate entities. In certain embodiments, the functionalities of the server 106 can be incorporated in its entirety or at least partially in the system 102, without a departure from the scope of the disclosure.

The database 108 may include suitable logic, interfaces, and/or code that may be configured to store object pattern information, which may include, for example, example images of objects of each object class, object features, class labels or tags, and the like. The database 108 may be a relational or a non-relational database. In an embodiment, the database 108 may be stored on a server, such as a cloud server or may be cached and stored on the system 102.

The communication network 110 may include a communication medium through which the system 102 may communicate with the server 106 and other devices which are omitted from disclosure for the sake of brevity. The communication network 110 may include a wired connection, a wireless connection, or a combination thereof. Examples of the communication network 110 may include, but are not limited to, the Internet, a cloud network, a Wireless Fidelity (Wi-Fi) network, a satellite communication network (such as using a Global Navigation Satellite System (GNSS) satellite constellation), a cellular or mobile wireless network (such as 4th Generation Long-Term Evolution (LTE) or 5th Generation New Radio (NR)), a Personal Area Network (PAN), a Local Area Network (LAN), or a Metropolitan Area Network (MAN). Various devices in the network environment 100 may be configured to connect to the communication network 110 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, satellite communication protocols, and Bluetooth (BT) communication protocols.

In operation, the image sensor circuitry 104 may produce an output which may include one or more frames of a scene. In an embodiment, the system 102 may control the image sensor circuitry 104 to acquire image signals, which may be represented as one or more frames of a scene.

The system 102 may acquire the output of the image sensor circuitry 104. The acquired output may include one or more frames. For example, the acquired output may include a first frame 114, which may be associated with a scene with one or more static objects, one or more moving objects, or a combination thereof.

The system 102 may detect feature points in the first frame 114 of the acquired output. Each of such feature points may correspond to information associated with a specific structure, such as points, edges or elementary object or shape components in the first frame 114. Additionally, or alternatively, such feature points may be feature vectors or a result of a general neighborhood operation or feature detection applied to the first frame 114. Based on feature points associated with one or more first objects in the first frame 114 of the acquired output, the system 102 may determine a first object classification result. In an embodiment, the first object classification result may include bounding boxes around such first objects in the first frame 114 and a class label predicted for such first objects. In these or other embodiments, such first objects may be in a stationary state in the scene or may be about to reach a stationary state in the scene.

In some scenarios, it is possible that the first object classification result may not detect and classify all objects of interest which may be present in the scene and in the first frame 114. For example, some objects may be mis-detected or may remain undetected. Also, even if some objects are detected in the first frame 114, it is possible that one or more of such objects are mis-classified. Therefore, an event-camera signal processing may be separately executed to detect objects in the scene which may be in motion and information for which may be captured in the acquired output of the image sensor circuitry 104.

The system 102 may execute an event-camera signal processing operation on at least two frames of the acquired output to generate the event frame 116. The generated event frame 116 may include pixel-level movement information associated with one or more second objects. In contrast to standard frame-based camera processing, the event-camera signal processing operation may output events, each of which may represent a brightness change. For each pixel position in the frames of acquired output, the circuitry 202 may record a log intensity each time it may detect an event and may continuously monitor for a change of sufficient magnitude from the recorded intensity. When the change exceeds a threshold, the circuitry 202 may detect a new event, which may be recorded with a location of the pixel, the time at which the new event is detected, and a polarity of the brightness change (e.g., 1 for an increase in brightness or 0 for a decrease in brightness).

The pixel-level movement information 308A may correspond to the brightness or intensity changes, recorded in pixels of the event frame 116. Based on the pixel-level movement information, the system 102 may determine a second object classification result. In an embodiment, the second object classification result may include bounding boxes around such second objects in the event frame 116 and a class label predicted for such second objects. In some scenarios, the second object classification result may detect and classify object(s) which may be mis-detected, mis-classified, or may not be included at all in the first object classification result for the first frame 114. Therefore, the second object classification result may supplement the process of classification of all object(s) of interest in the scene, as captured in the acquired output of the image sensor circuitry 104. Based on the determined first object classification result and the determined second object classification result, the system 102 may determine one or more object classification tags. Such object classification tags may correspond to one or more objects which may be included in at least the one or more first objects and the one or more second objects.

Figure 2:
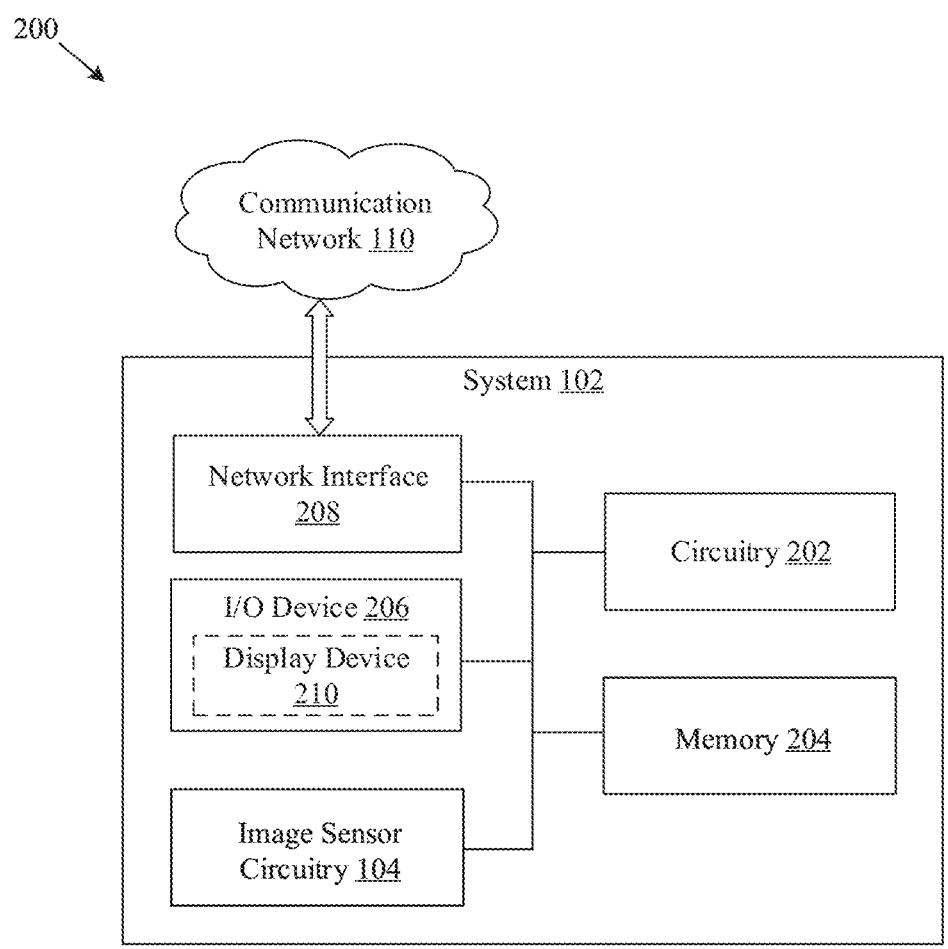
FIG. 2 is a block diagram of an exemplary system of FIG. 1, in accordance with an embodiment of the disclosure.

FIG. 2 is a block diagram of the exemplary system of FIG. 1, in accordance with an embodiment of the disclosure. FIG. 2 is explained in conjunction with elements from FIG. 1. With reference to FIG. 2, there is shown a block diagram 200 of the system 102. The system 102 may include circuitry 202, a memory 204, an input/output (I/O) device 206, and a network interface 208. In an embodiment, the system 102 may also include the image sensor circuitry 104. The circuitry 202 may be communicatively coupled to the memory 204, the I/O device 206, and the network interface 208. The I/O device 206 may include a display device 210, for example.

The circuitry 202 may include suitable logic, circuitry, and/or interfaces that may be configured to execute program instructions associated with different operations to be executed by the system 102. The circuitry 202 may include one or more specialized processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, and/or interfaces that may be configured to store program instructions to be executed by the circuitry 202. In at least one embodiment, the memory 204 may be configured to store the first frame 114, the event frame 116, the first object classification result, the second object classification result, and the one or more object classification tags. The memory 204 may be configured to store the object class. Example implementations of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. The I/O device 206 may include various input and output devices, which may be configured to communicate with the circuitry 202. For example, the system 102 may receive a user input via the I/O device 206 to select a user interface element and to initiate the frame and event camera processing. Examples of the I/O device 206 may include, but are not limited to, a touch screen, a keyboard, a mouse, a joystick, a display device (for example, the display device 210), a microphone, or a speaker.

The display device 210 may include suitable logic, circuitry, and/or interfaces that may be configured to display the user interface elements. In one embodiment, the display device 210 may be a touch-enabled device which may be configured to receive a user input from the user 112 via the display device 210. The display device 210 may include a display unit that may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display unit of the display device 210 may refer to a display screen of a head mounted device (HMD), a smart-glass device, a see-through display, a projection-based display, an electro-chromic display, or a transparent display.

The network interface 208 may include suitable logic, circuitry, interfaces, and/or code that may be configured to facilitate the circuitry 202 to communicate with the image sensor circuitry 104 and/or other communication devices, via the communication network 110. The network interface 208 may be implemented by use of various known technologies to support wireless communication of the system 102 via communication network 110. The network interface 208 may include, for example, an antenna, a radio frequency (RF) transceiver, one or more amplifiers, a tuner, one or more oscillators, a digital signal processor, a coder-decoder (CODEC) chipset, a subscriber identity module (SIM) card, a local buffer circuitry, and the like.

The network interface 208 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), satellite communication (such as with a GNSS satellite constellation), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), or Worldwide Interoperability for Microwave Access (Wi-MAX).

The functions or operations executed by the system 102, as described in FIG. 1, may be performed by the circuitry 202. Operations executed by the circuitry 202 are described in detail, for example, in FIGS. 3A and 3B, FIGS. 4A and 4B, FIG. 5, FIGS. 6A, 6B, and 6C, FIGS. 7A and 7B, FIG. 8, and FIG. 9.

Figure 3A:
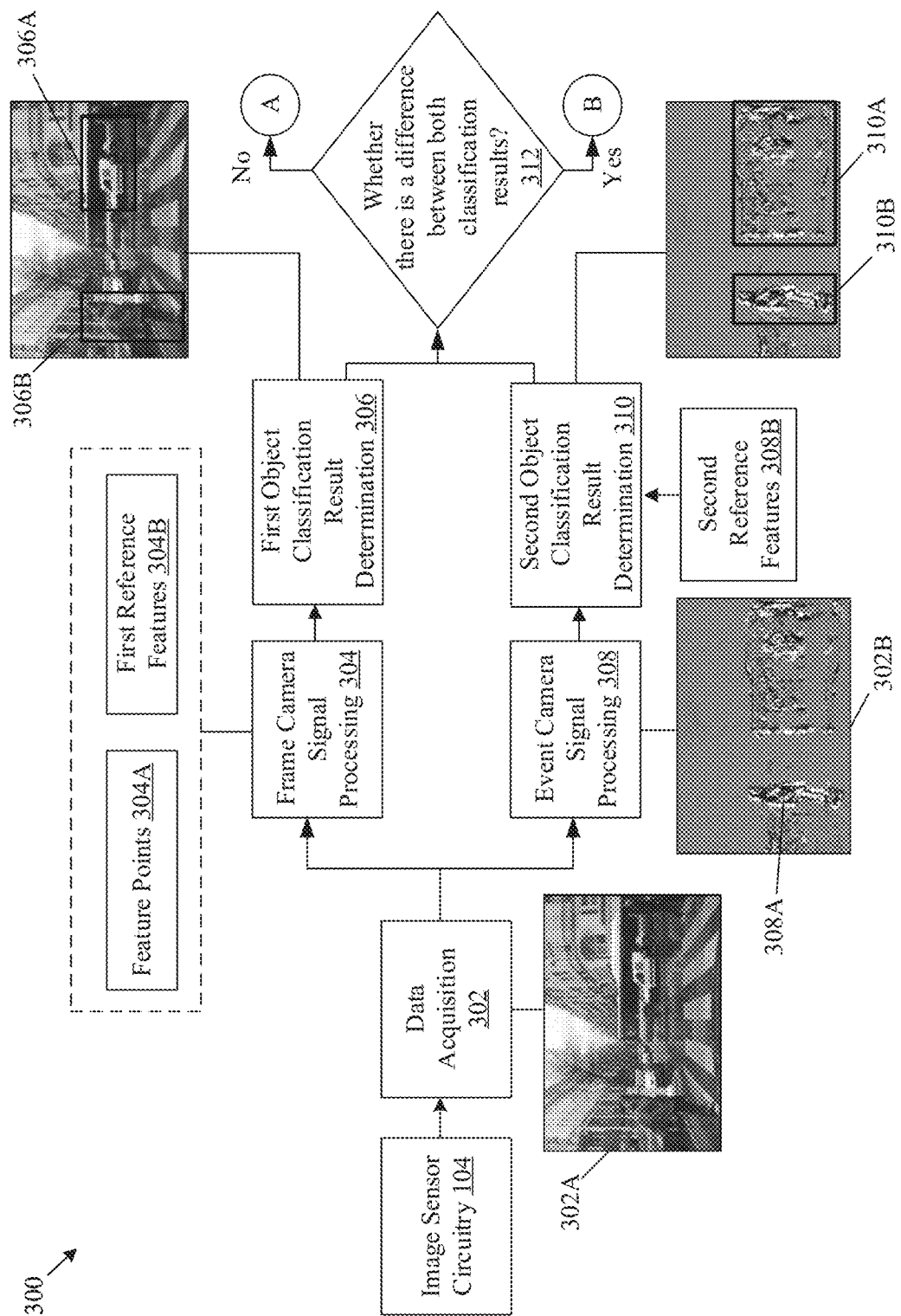
FIGS. 3A and 3B, collectively, depict a block diagram that illustrates exemplary operations for object classification based on frame and event camera processing, in accordance with an embodiment of the disclosure.
Figure 3B:
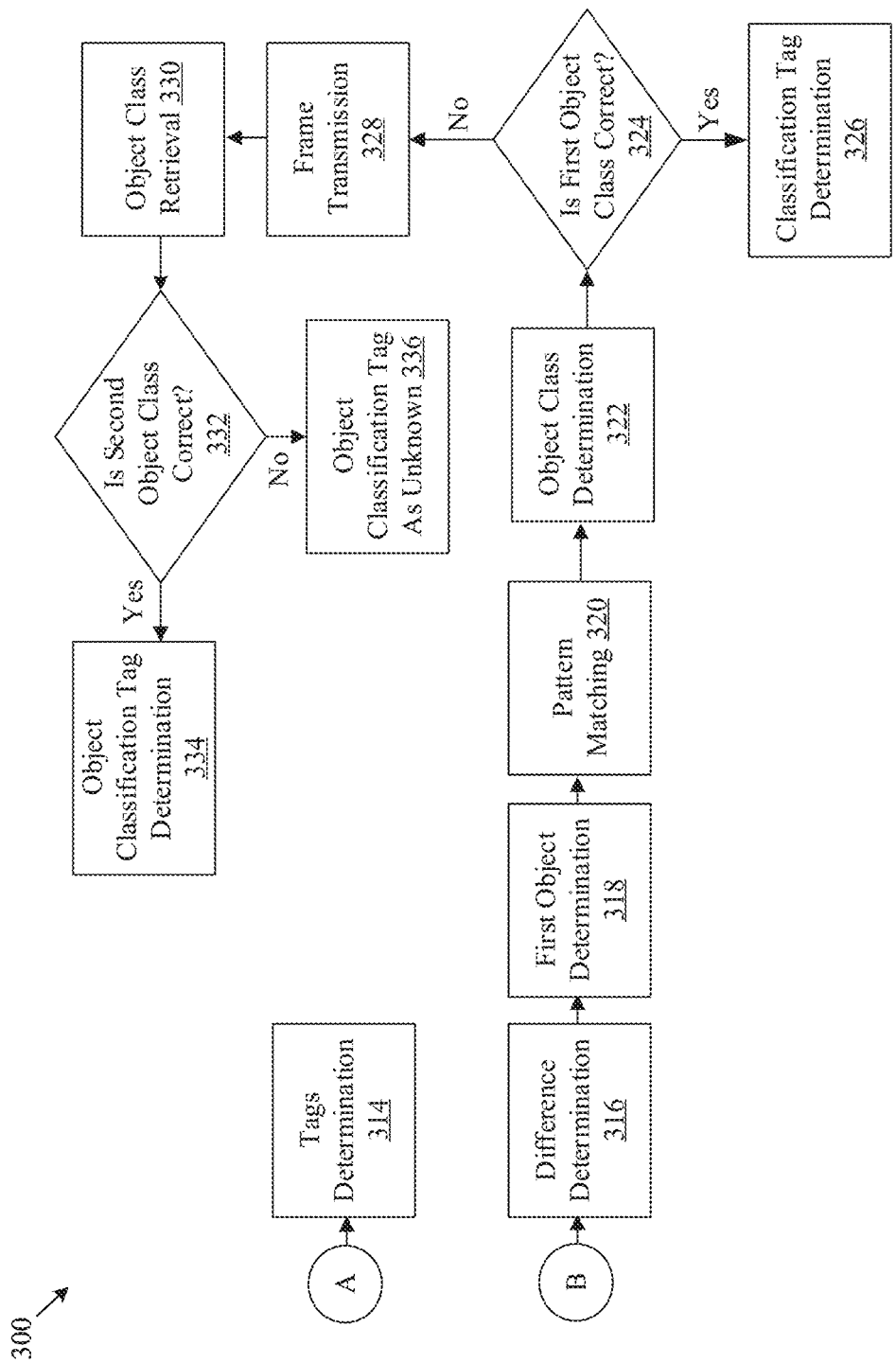

FIGS. 3A and 3B, collectively, depict a block diagram that illustrates exemplary operations for object classification based on frame and event camera processing, in accordance with an embodiment of the disclosure. FIGS. 3A and 3B are explained in conjunction with elements from FIGS. 1 and 2. With reference to FIGS. 3A and 3B, there is shown a block diagram 300 that illustrates exemplary operations from 302 to 336, as described herein. The exemplary operations illustrated in the block diagram 300 may start at 302 and may be performed by any computing system, apparatus, or device, such as, by the system 102 of FIG. 1 or FIG. 2. Although illustrated with discrete blocks, the exemplary operations associated with one or more blocks of the block diagram 300 may be divided into additional blocks, combined into fewer blocks, or eliminated, depending on implementation of the exemplary operations.

At 302, data acquisition may be done. In an embodiment, the circuitry 202 may acquire an output of the image sensor circuitry 104. The image sensor circuitry 104 may be integrated into the system 102 or may be connected to the system 102 externally via a network interface or I/O interface. In an embodiment, the output may be acquired from a data source which may be, for example, a persistent storage on the system 102, a cloud server, and the like. In another embodiment, the output may be acquired directly (in its uncompressed or raw form) from frame buffers of the image sensor circuitry 104. The acquired output may include one or more frames of a scene in FOV of the image sensor circuitry 104. Each frame of the acquired output may include at least one object.

At 304, a frame-camera signal processing operation may be executed. In an embodiment, the circuitry 202 may be configured to execute the frame-camera signal processing operation on the acquired output to obtain a first frame 302A. As shown, for example, the first frame 302A depicts a scene of a busy road and includes a pedestrian and a stationary vehicle. In an embodiment, operations, such as noise reduction and edge detection may be executed on the first frame 302A. Depending on the image sensor circuitry 104, such operations may be executed before the Analog-to-Digital (ADC) of the image sensor circuitry 104).

As part of the frame-camera signal processing operation, the circuitry 202 may detect feature points 304A in the first frame 302A of the acquired output. The detected feature points 304A may be referred to as unique features associated with one or more first objects in the first frame 302A. In an embodiment, the feature points 304A may include information which may be required to classify each of such first objects in a particular object class. For example, a first object may have feature points, such as, but not limited to, a headlight, windows, and wheels and a second object may have feature points, such as, but not limited to, legs, arms, and face.

The circuitry 202 may determine a first pattern match between the detected feature points 304A and first reference features 304B associated with known object classes. The first reference features 304B may include feature points or template features, which may be extracted from a training dataset of images of objects (which may belong to known object classes and may be stored in the database 108, for example). The first pattern match may be determined based on implementation of a pattern matching method. The pattern matching method may include a set of computational techniques, by which the detected feature points 304A may be matched with the first reference features 304B. Based on the match, a group of feature points, from among the detected feature points 304A, may be probabilistically classified to a particular object class. The pattern matching method may be, for example, a template matching method, a machine learning, or deep learning-based pattern matching method, Haar cascades, or any feature matching method which may be based on features, such as Haar features, Local Binary Pattern (LBP), or Scale Invariant Feature Transform (SIFT) features. Detailed implementation of these example methods may be known to one skilled in the art, and therefore, a detailed description of such methods has been omitted from the disclosure for the sake of brevity.

At 306, a first object classification result may be determined. In an embodiment, the circuitry 202 may be configured to determine the first object classification result based on the feature points 304A associated with one or more first objects in the first frame 302A. Specifically, the first object classification result may be determined based on the first pattern match (determined at 304). The first object classification result may include the first frame 302A overlaid with first bounding box information associated with the one or more first objects. As shown, for example, the bounding box information may include a bounding box 306A and a bounding box 306B, which may be predicted to include the one or more first objects. In an embodiment, the first object classification result may also include one or more class labels (for example, a car, a person, or a bike) corresponding to the one or more first objects in the first frame 302A.

In some scenarios, it is possible that the first object classification result may not detect and classify all objects of interest which may be present in the scene and in the first frame 302A. For example, some objects may be mis-detected or may remain undetected. Also, even if some objects are detected in the first frame 302A, it is possible that one or more of such objects are mis-classified. Therefore, an event-camera signal processing may be separately executed to help detect and classify all objects of interest in the scene, information of which may be captured in the acquired output of the image sensor circuitry 104.

At 308, an event-camera signal processing operation may be executed. In an embodiment, the circuitry 202 may be configured to execute the event-camera signal processing operation on at least two frames (or scans) of the acquired output to generate an event frame 302B. The generated event frame 302B may include pixel-level movement information 308A associated with one or more second objects. In an embodiment, there may be at least one object which may be common between the one or more second objects and the one or more first objects. In another embodiment, there may be no object common between the one or more first objects and the one or more second objects. In another embodiment, the one or more first objects may be same as the one or more second objects.

The event-camera signal processing operation may include measurement of brightness or intensity changes (asynchronously and independently) for every pixel from at least two scans or frames of the acquired output. An initial output of the event-camera signal processing operation may include a sequence of digital events or spikes, with each event representing a change of brightness (e.g., measured in terms of log intensity). Brightness or intensity changes which may be below a preset threshold may not be included in the sequence of digital events or spikes.

In contrast to standard frame-based camera processing, the event-camera signal processing operation may output events, each of which may represent a brightness change. For each pixel position in the frames of acquired output, the circuitry 202 may record a log intensity each time it may detect an event and may continuously monitor for a change of sufficient magnitude from this recorded value. When the change exceeds a threshold, the circuitry 202 may detect a new event, which may be recorded with a location of the pixel, the time at which the new event is detected, and a polarity of the brightness change (e.g., 1 for an increase in brightness or 0 for a decrease in brightness). The pixel-level movement information 308A may correspond to the brightness or intensity changes, recorded in pixels of the event frame 302B. For example, a moving object may cause changes in intensity of light signals incident on specific pixel locations of the image sensor circuitry 104. Such changes may be recorded in the event frame 302B, with pixels therein corresponding to the specific pixel locations of the image sensor circuitry 104.

At 310, a second object classification result may be determined. In an embodiment, the circuitry 202 may be configured to determine the second object classification result based on the pixel-level movement information 308A. The second object classification result may include the event frame 302B overlaid with second bounding box information associated with the one or more second objects. The bounding box information may include one or more bounding boxes, such as a bounding box 310A and a bounding box 310B, which may be predicted to include the one or more second objects. The first object classification result may also include one or more class labels (for example, a car, a person, or a bike) corresponding to the one or more second objects in the event frame 302B.

In an embodiment, the circuitry 202 may determine the second object classification result by pattern matching the pixel-level movement information 308A with second reference features 308B associated with known object classes. Similar to the first reference features 304B, the second reference features 308B may include feature points or template features, which may be extracted from a training dataset of images of objects (which may belong to known object classes and may be stored in the database 108, for example). In an embodiment, the second reference features 308B may include pixel information associated with objects or object components of known object classes. The pattern matching may be based on a method, examples of which are mentioned (at 304) in the foregoing description. Detailed implementation of these example methods may be known to one skilled in the art, and therefore, a detailed description of such methods has been omitted from the disclosure for the sake of brevity.

At 312, the first and second classification results may be compared. In an embodiment, the circuitry 202 may be configured to compare the determined first object classification result with the determined second object classification result. Based on comparison, it may be determined whether or not there is a difference between the first object classification result and the second object classification result. In case there is no difference between the first object classification result and the second object classification result, control may pass to 314. Otherwise, control may pass to 316.

At 314, object classification tags may be determined for one or more objects. The circuitry 202 may be configured to determine one or more object classification tags based on the determined first object classification result and the determined second object classification result. The determined one or more object classification tags may correspond to one or more objects, which may be included in at least the one or more first objects and the one or more second objects. Each of such object classification tags may specify an object class to which an object may be belong to. For example, the first object classification result may include the first frame 302A overlaid with bounding boxes (i.e., the bounding box 306A and the bounding box 306B) over a car and a pedestrian (i.e., first objects) and the second object classification result may include the event frame 302B overlaid with bounding boxes (i.e., the bounding box 310A and the bounding box 310B) over the car and a pedestrian in the event frame 302B. For the car and the pedestrian, the object classification tags may be determined as "car" and "human", respectively.

At 316, a difference may be determined between the determined first object classification result and the determined second object classification result. In an embodiment, the circuitry 202 may be configured to determine a difference between the determined first object classification result and the determined second object classification result. For example, a scene a may include a moving vehicle and a pedestrian. The determined first object classification result may only include the bounding box information for a pedestrian. In such a case, the frame-based camera processing may have missed to detect the moving vehicle. On the other hand, the determined second object classification result may include the bounding box information for the moving vehicle and the pedestrian. Based on the determined first object classification result and the determined second object classification result, a difference may be determined at pixel locations where the moving vehicle is present.

At 318, a first object which causes the first object classification result to differ from the second object classification result may be determined. In an embodiment, the circuitry 202 may be configured to determine a first object (for example, the moving vehicle) which may be either misclassified, unclassified, detected but unclassified, mis-detected, or mis-detected and mis-classified. The first object may be determined based on the determined difference and from among the one or more first objects or the one or more second objects. For example, if an object is detected in both the first and second object classification results, but the class of the first object in the first object classification result is different from that of the object in the second object classification result, then that object may be included in the determined difference. Similarly, if the second object detection result detects an object which is not detected in the first object detection result, then that object may be also included in the determined difference.

At 320, a pattern matching operation may be executed. In an embodiment, the circuitry 202 may be configured to execute a pattern matching operation for the determined first object. Such an operation may be executed based on the determined difference, the first object classification result, and the second object classification result. In another embodiment, the circuitry 202 may transmit information, such as the determined difference, the first object classification result, the second object classification result, the first frame 302A, and/or the event frame 302B to an edge node. The edge node, such as an edge computing device, may be configured to receive the information and execute the pattern matching operation based on the received information.

In an embodiment, the pattern matching operation may be a machine learning-based pattern matching operation or a deep learning-based pattern matching operation. The pattern matching operation may rely on a machine learning (ML) model or a deep learning model, trained on a pattern matching task to detect and/or classify object(s) in the first frame 302A and/or the event frame 302B. Such a model may be defined by its hyper-parameters and topology/architecture. For example, a neural network-based model may have number of nodes (or neurons), activation function(s), number of weights, a cost function, a regularization function, an input size, a learning rate, number of layers, and the like, as its hyperparameters. Such a model may be referred to as a computational network or a system of nodes (for example, artificial neurons). For a deep learning implementation, the nodes of the deep learning model may be arranged in layers, as defined in a neural network topology. The layers may include an input layer, one or more hidden layers, and an output layer. Each layer may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the model. Outputs of each hidden layer may be coupled to inputs of at least one node in other layers of the deep learning model. Node(s) in the final layer may receive inputs from at least one hidden layer to output a result. The number of layers and the number of nodes in each layer may be determined from the hyper-parameters, which may be set before, while, or after training the deep learning model on a training dataset.

Each node of the deep learning model may correspond to a mathematical function (e.g., a sigmoid function or a rectified linear unit) with a set of parameters, tunable during training of the model. The set of parameters may include, for example, a weight parameter, a regularization parameter, and the like. Each node may use the mathematical function to compute an output based on one or more inputs from nodes in other layer(s) (e.g., previous layer(s)) of the deep learning model. All or some of the nodes of the deep learning model may correspond to same or a different same mathematical function.

In training of the deep learning model, one or more parameters of each node may be updated based on whether an output of the final layer for a given input (from the training dataset) matches a correct result based on a loss function for the deep learning model. The above process may be repeated for same or a different input till a minima of loss function is achieved, and a training error is minimized. Several methods for training are known in the art, for example, gradient descent, stochastic gradient descent, batch gradient descent, gradient boost, meta-heuristics, and the like.

In an embodiment, the ML model or the deep learning model may include electronic data, which may be implemented as, for example, a software component of an application executable on the system 102. The ML model or the deep learning model may rely on libraries, external scripts, or other logic/instructions for execution by a processing device, such as the system 102. The ML model or the deep learning model may include computer-executable codes or routines to enable a computing device, such as the system 102 to perform one or more operations, such as to detect and classify objects in input image or event frames. Additionally, or alternatively, the ML model or the deep learning model may be implemented using hardware, including but not limited to, a processor, a microprocessor (e.g., to perform or control performance of one or more operations), a field-programmable gate array (FPGA), or an application-specific integrated circuit (ASIC). For example, an inference accelerator chip may be included in the system 102 to accelerate computations of the ML model or the deep learning model. In some embodiments, the ML model or the deep learning model may be implemented using a combination of both hardware and software.

Examples of the deep learning model may include, but are not limited to, an artificial neural network (ANN), a convolutional neural network (CNN), Regions with CNN (R-CNN), Fast R-CNN, Faster R-CNN, a You Only Look Once (YOLO) network, a Residual Neural Network (ResNet), a Feature Pyramid Network (FPN), a Retina-Net, a Single Shot Detector (SSD), and/or a combination thereof.

At 322, a first object class may be determined. In an embodiment, the circuitry 202 may be configured to classify the determined first object into a first object class based on the execution of the pattern matching operation. The first object class may specify a class to which the first object may belong to.

At 324, it may be determined whether the first object class is correct. In an embodiment, the circuitry 202 may be configured to determine whether or not the first object class is correct. For instance, the circuitry 202 may match the first object class with an object class initially identified in the first object classification result or the second object classification result. If both object classes match, then the first object class may be determined to be correct and control may pass to 326. Otherwise, control may pass to 328.

At 326, a first object classification tag may be determined. In an embodiment, the circuitry 202 may be configured to determine, for the first object, a first object classification tag of the one or more object classification tags based on a determination that the first object class is correct.

At 328, the event frame 302B or the first frame 302A may be transmitted to a server (such as the server 106). In an embodiment, the circuitry 202 may transmit the event frame 302B or the first frame 302A to the server based on a determination that the first object class is incorrect.

At 330, a second object class may be received from the server. In an embodiment, the circuitry 202 may receive a second object class for the determined first object from the server 106 based on the transmission. The second object class may be different from the determined first object class. The server may implement a pattern matching method with or without the support of an exhaustive database of object images and pattern matching information (such as template features).

At 332, it may be determined whether or not the second object class is correct. In an embodiment, the circuitry 202 may be configured to determine whether or not the second object class is correct. The circuitry 202 may match the second object class with an object class initially identified in the first object classification result or the second object classification result. If both object classes match, then the second object class may be determined to be correct and control may pass to 334. Otherwise, control may pass to 336.

At 334, an object classification tag for the first object may be determined. In an embodiment, the circuitry 202 may determine, for the first object, a first object classification tag based on a determination that the second object class is correct. The first object classification tag may be included in the one or more object classification tags (determined at 314).

At 336, the circuitry 202 may determine the object classification tag for the first object as unknown. The first object may be tagged with the object classification tag. The tagging may be reported to the server (such as the server 106) to improve a database (such as the database 108) for the pattern matching. Control may pass to end.

Figure 4A:
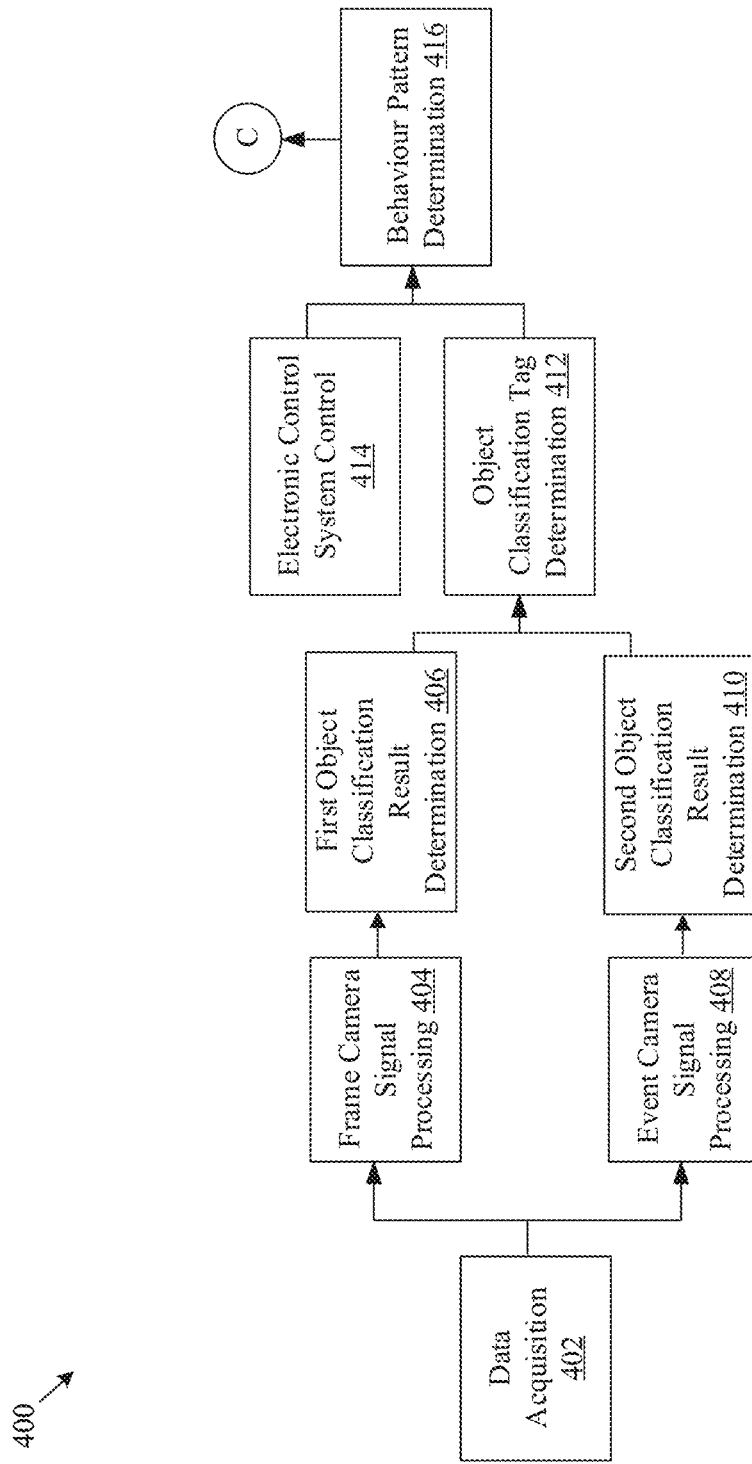
FIGS. 4A and 4B, collectively, depict a block diagram that illustrates exemplary operations for determination of a behavior pattern of a driver of a vehicle, in accordance with an embodiment of the disclosure.
Figure 4B:
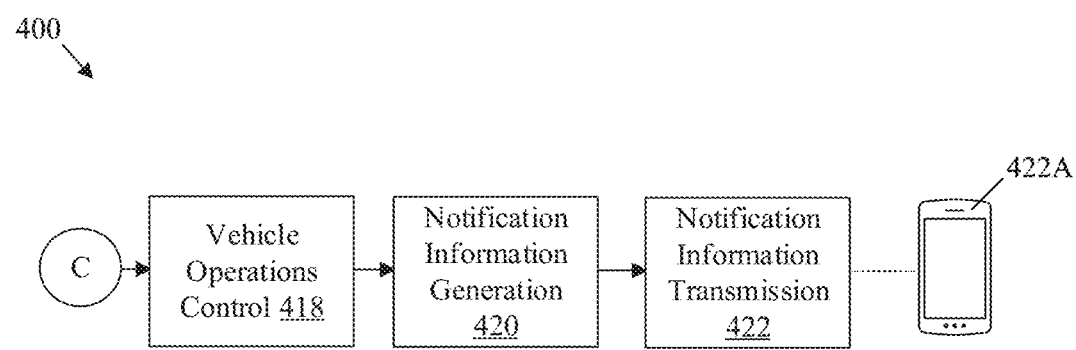

FIGS. 4A and 4B, collectively, depict a block diagram that illustrates exemplary operations for determination of a behavior pattern of a driver of a vehicle, in accordance with an embodiment of the disclosure. FIGS. 4A and 4B are explained in conjunction with elements from FIGS. 1, 2, 3A, and 3B. With reference to FIGS. 4A and 4B, there is shown a block diagram 400 that illustrates exemplary operations 402 to 422, as described herein. The exemplary operations illustrated in the block diagram 400 may start at 402 and may be performed by any computing system, apparatus, passenger drone, or device, such as, by the system 102 of FIG. 1 or FIG. 2. Although illustrated with discrete blocks, the exemplary operations associated with one or more blocks of the block diagram 400 may be divided into additional blocks, combined into fewer blocks, or eliminated, depending on implementation of the exemplary operations.

At 402, data may be acquired. In an embodiment, the circuitry 202 may acquire the output of the image sensor circuitry 104 (as described, for example, at 302 of FIG. 3A). Each of the first frame 114 and the event frame 116 may capture scene information of an environment outside a vehicle. The image sensor circuitry 104 may be installed inside the vehicle (such as a dash camera), mounted outside on the body of the vehicle, or may be part of a roadside unit (such as a traffic camera or any device which may include a camera and/or may be a part of a Vehicle-to-Everything (V2X) network). The vehicle may be an autonomous, a semi-autonomous, or a non-autonomous vehicle. Examples of the vehicle may include, but are not limited to, an electric vehicle, a hybrid vehicle, and/or a vehicle that uses a combination of one or more distinct renewable or non-renewable power sources. The present disclosure may be also applicable to vehicles, such as two-wheeler vehicles, three-wheeler vehicles, four-wheeler vehicles, or vehicles with more than four wheels. A description of such vehicles has been omitted from the disclosure for the sake of brevity.

The scene information of the environment outside the vehicle may include objects, which typically appear on roads or in a driving environment. For example, the scene information of the environment outside the vehicle may include information on roads and road types, lanes, traffic signals or signs, pedestrians, roadside infrastructure, nearby vehicles, and the like.

At 404, a frame-camera signal processing operation may be executed. In an embodiment, the circuitry 202 may be configured to execute the frame-camera signal processing operation on the first frame 114 of the acquired output to detect feature points 304A in the first frame 114 of the acquired output (as described, for example, at 304 of FIG. 3A).

At 406, the first object classification result may be determined. In an embodiment, the circuitry 202 may be configured to determine the first object classification result based on feature points 304A associated with one or more first objects in the first frame 114 of the acquired output (as described for example, at 306 of FIG. 3A).

At 408, an event-camera signal processing operation may be performed. In an embodiment, the circuitry 202 may be configured to execute the event-camera signal processing operation on at least two frames of the acquired output to generate the event frame 116 (as described for example, at 308 of FIG. 3A).

At 410, the second object classification result may be determined. In an embodiment, the circuitry 202 may be configured to determine the second object classification result based on the pixel-level movement information included in the generated event frame 116 (as described for example, at 310 of FIG. 3A).

At 412, object classification tags may be determined. In an embodiment, the circuitry 202 may be configured to determine one or more object classification tags based on the determined first object classification result and the determined second object classification result (as described, for example, in operations from 312 to 336 of FIG. 3A and FIG. 3B).

At 414, an electronic control system of the vehicle may be controlled to detect an event including but not limited to, an accident or a near miss in the environment. In an embodiment, the circuitry 202 may be configured to control the electronic control system of the vehicle to detect an event, including but not limited to, an accident or a near miss in the environment. By way of example, and not limitation, the electronic control system may be one of Advanced Driver Assistance System (ADAS) or an Autonomous Driving (AD) system. Detailed implementation of the ADAS or AD system may be known to one skilled in the art, and therefore, a detailed description of such systems has been omitted from the disclosure for the sake of brevity.

At 416, a behavior pattern of a driver of the vehicle may be determined. In an embodiment, the circuitry 202 may be configured to determine the behavior pattern of a driver of the vehicle based on the determined one or more object classification tags and the detected event. The behavior pattern may refer to a set of actions, observations, or judgements which may be related to the driver or the vehicle and may be recorded around the time the event is detected (for example, from before (or just before) the event is detected to a certain period after the event is detected). In an embodiment, machine learning may be used on the system 102 to determine the behavior pattern of the driver. Also, a scene graph may also be constructed on the system 102 depict relations among various datapoints logged around the time period within which the event is detected. An example of the scene graph for a near miss event is provided in FIG. 6A and FIG. 6B. By way of example, and not limitation, the behavior pattern may include a driving pattern, a measure of driver's attentiveness to the environment outside the vehicle, activities which the driver performs while driving, and the like. The driving pattern may be based on data, such as an average speed of vehicle before, at the time, or after the event is detected, the one or more object classification tags. For example, a driver may drive at low speed when a pedestrian (a detected object on road) is about to cross the road, and at a fast speed when the road is empty. It may be also possible to profile the driver according to driving skills, which may be determined from the behavior pattern.

At 418, one or more operations of the vehicle may be controlled. In an embodiment, the circuitry 202 may be configured to control one or more operations of the vehicle based on the determined behavior pattern. For example, based on the behavior pattern, it may be determined that the driver is inattentive or is not slowing down while approaching a traffic stop sign, then the circuitry 202 (e.g., as part of vehicle ECU) may apply the brake to lower the speed of the vehicle. Details of such control of one or more operations are further described, for example, in FIGS. 6A and 6B.

At 420, notification information may be generated. In an embodiment, the circuitry 202 may generate notification information based on the determined behavior pattern. The notification information may include, for example, a message which may alert the driver regarding traffic-related events (such as accidents, near misses, or turns) nearby, a prompt or instruction to the driver to modify a behavior or execute a vehicle operation (such as to stop near the traffic stop sign). An example of notification information is provided, for example, in FIGS. 7A and 7B.

At 422, the generated notification information may be transmitted to an electronic device 422A. In an embodiment, the circuitry 202 may transmit the generated notification information to the electronic device 422A, which may be associated with the vehicle or the driver of the vehicle. For example, the electronic device 422A may be a smartphone, any personal device (which the driver may carry) or may be a display screen of the vehicle. The electronic device 422A may receive and render the notification information.

Figure 5:
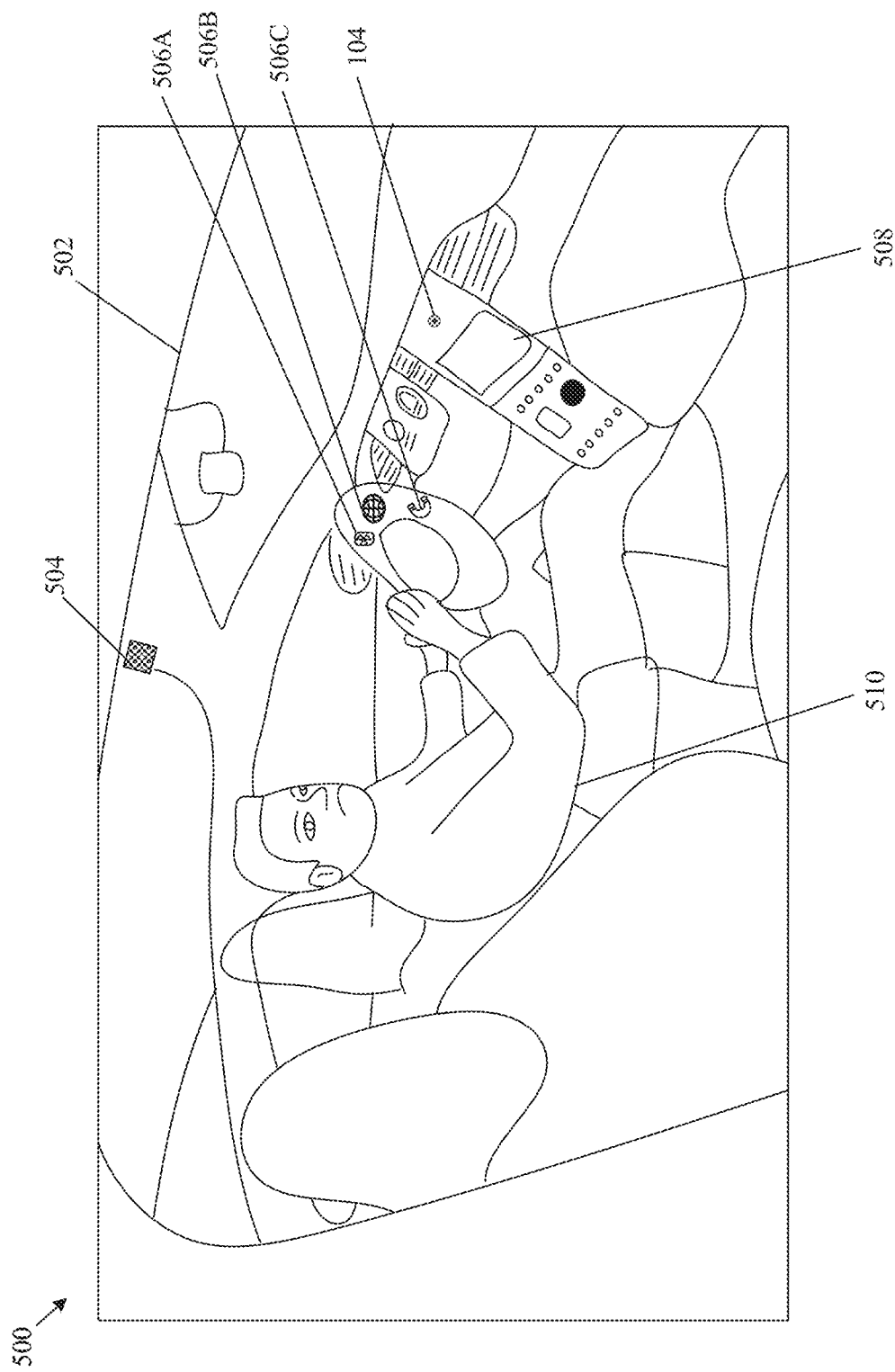
FIG. 5 is a diagram that illustrates an exemplary scenario for control one or more vehicle functions based on selection of a virtual user interface (UI) element, in accordance with an embodiment of the disclosure.

FIG. 5 is a diagram that illustrates an exemplary scenario for control one or more vehicle functions based on selection of a virtual user interface (UI) element, in accordance with an embodiment of the disclosure. FIG. 5 is explained in conjunction with elements from FIGS. 1, 2, 3A, 3B, 4A, and 4B. With reference to FIG. 5, there is shown an exemplary scenario 500 which depicts a vehicle 502. There is further shown an image projecting device 504, virtual UI elements 506A, 506B, and 506C, and a display device 508 (such as the display device 210). In FIG. 5, there is further shown a user 510 (for example, the driver) who sits on the driver seat inside the vehicle 502.

The image projecting device 504 may include suitable logic, circuitry, and interfaces that may be configured to project the virtual UI elements 506A, 506B, and 506C on any space (unused or less used) which may be accessible to the user 510 while driving the vehicle 502. The image projecting device 504 (such as a projector) may be coupled with the in-vehicle system (i.e., system 102) of the vehicle 502 to display the virtual UI elements 506A, 506B, and 506C.

In an embodiment, the circuitry 202 may control, inside the vehicle 502, the image projecting device 504 to project an image of a UI onto a projection surface inside the vehicle. The projection surface may be any surface inside the vehicle 502 that may be accessible to the user 510 and may be reliably utilized to display the virtual UI elements 506A, 506B, and 506C. As shown, for example, the projection surface is a portion of a steering wheel of the vehicle 502. It should be noted that the projection surface and the virtual UI elements 506A, 506B, and 506C in FIG. 5 are merely provided as an example. The present disclosure may be applicable to any project surface inside the vehicle 502 or any other machine and virtual UI elements (in any style, number, or appearance), without a deviation from the scope of the disclosure.

The circuitry 202 may be configured to acquire the output of the image sensor circuitry 104. Based on the acquired output, operations of FIG. 3A and FIG. 3B may be executed to generate the first frame 114 and the event frame 116 and to determine one or more object classification tags for one or more objects which may be captured in the first frame 114 and the event frame 116. Each of the first frame 114 and the event frame 116 may capture scene information of an in-vehicle environment inside the vehicle 502. The in-vehicle environment may include the user 510.

At any time-instant, the circuitry 202 may detect a finger movement over one of the virtual UI elements 506A, 506B, and 506C of the UI included in the projected image. Such detection may be done based on a second object classification tag of the determined one or more object classification tags. For example, the second object classification tag may specify a finger over the UI and the event frame 116 may indicate a movement of the finger around a region in the event frame 116 where the finger is detected.

In an embodiment, as part of an event camera signal processing operation, the circuitry 202 may detect edges around one or more objects (such as the finger) and may determine a presence of a sinking area on the steering wheel based on the event frame 116 and the detected edges. The presence of the sinking area may indicate a pressing action of the finger on one of the virtual UI elements 506A, 506B, and 506C. The finger movement may be detected based on the determination of the detection of the edges and the determination of the sinking area.

From among the virtual UI elements 506A, 506B, and 506C, the circuitry 202 select a virtual UI element based on the detection of the finger movement. In an embodiment, such selection may be based on the detection of the edges and a determination that the sinking area coincides with a region on the steering wheel where the selected virtual UI element is present. The circuitry 202 may control one or more vehicle functions based on the selection. For example, the virtual UI element 506A may turn on/off the Bluetooth functionality, the virtual UI element 506B may open the map application on the electronic device associated with the user 510 or the display device 508, and the virtual UI element 506C may open the phone application. The UI element may also be used to control vehicle functions, such as wiper control, headlamp control, or turn indicator control.

Figure 6A:
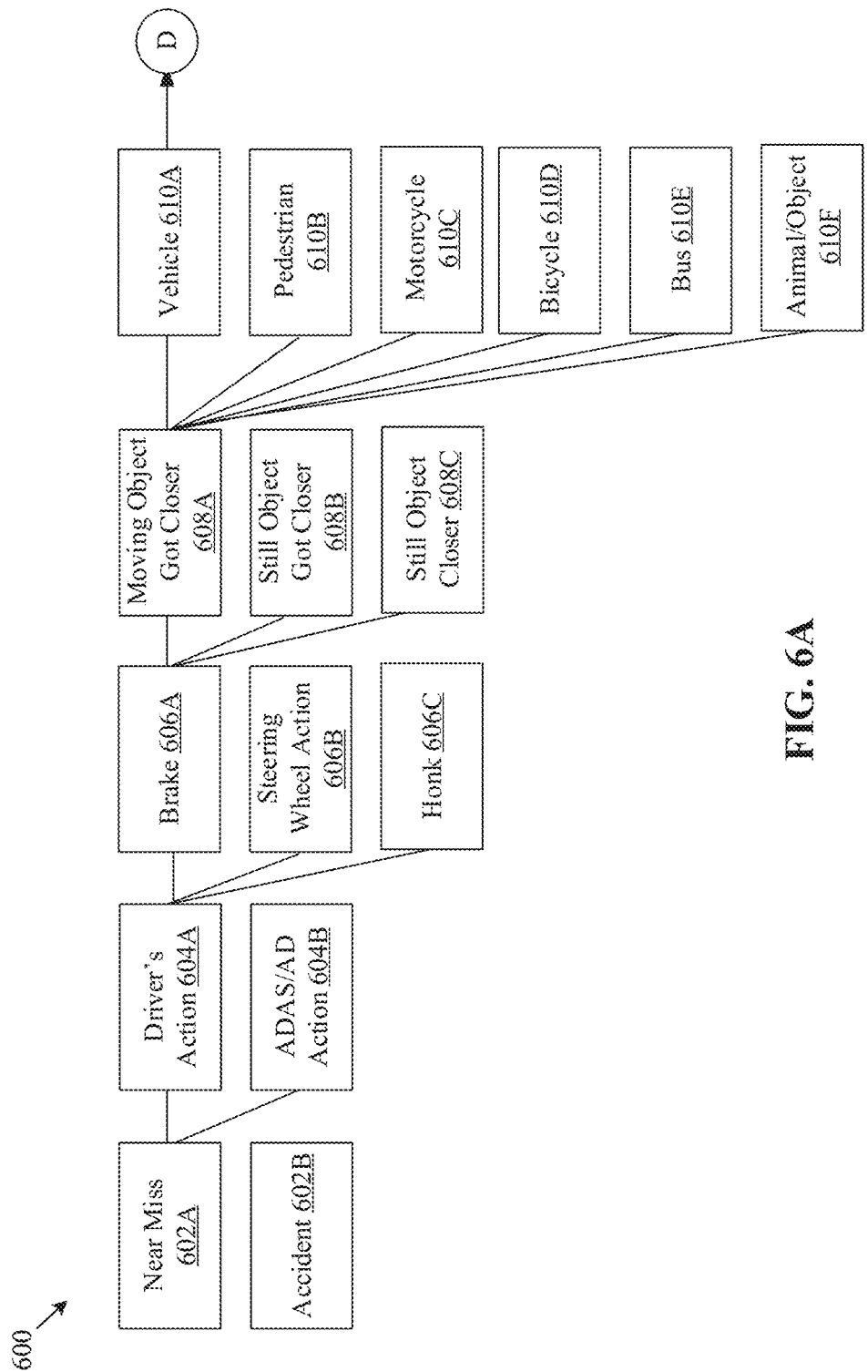
FIGS. 6A, 6B, and 6C, collectively, depict a diagram that illustrates an exemplary sequence of observations to be used for determination of a behavior pattern of a driver of a vehicle, in accordance with an embodiment of the disclosure.
Figure 6B:
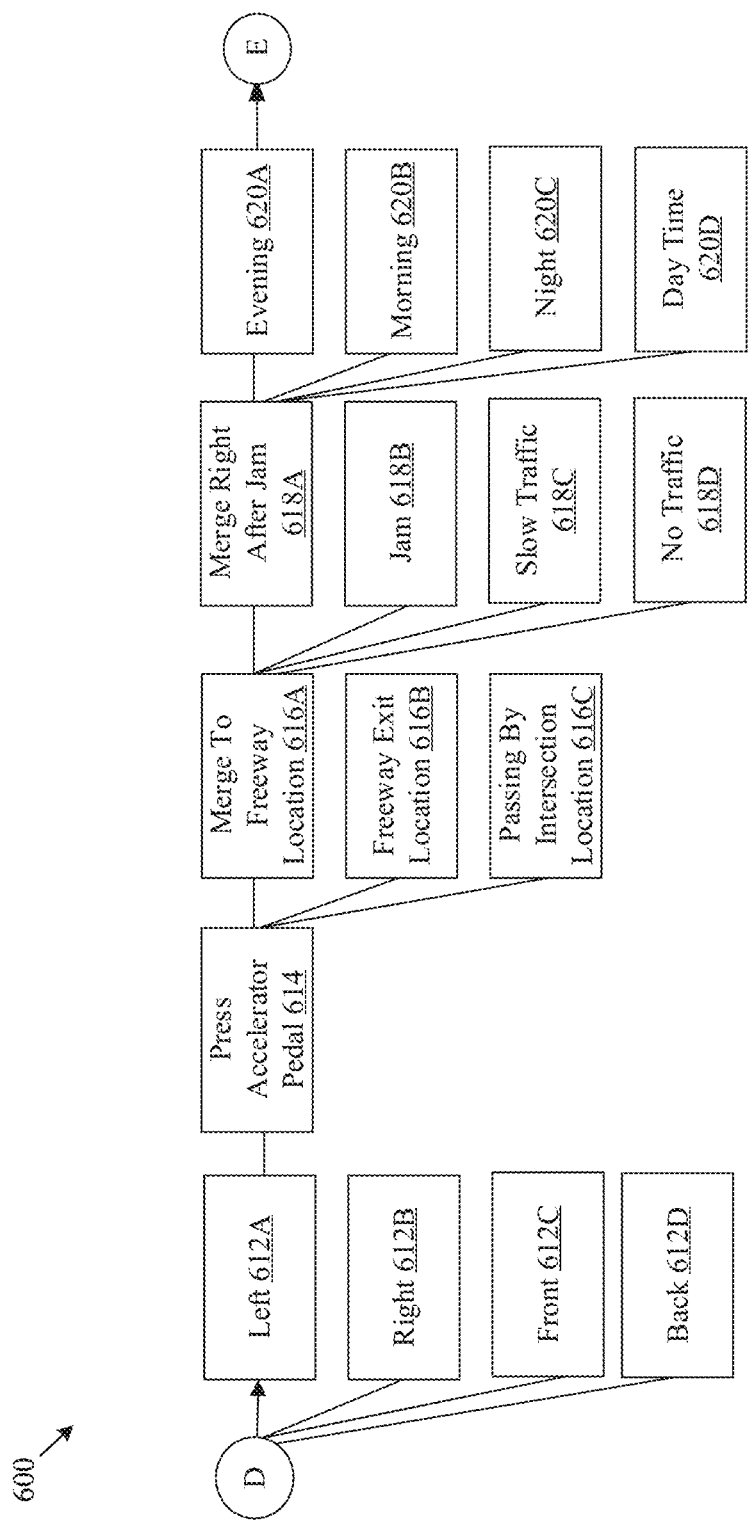
Figure 6C:
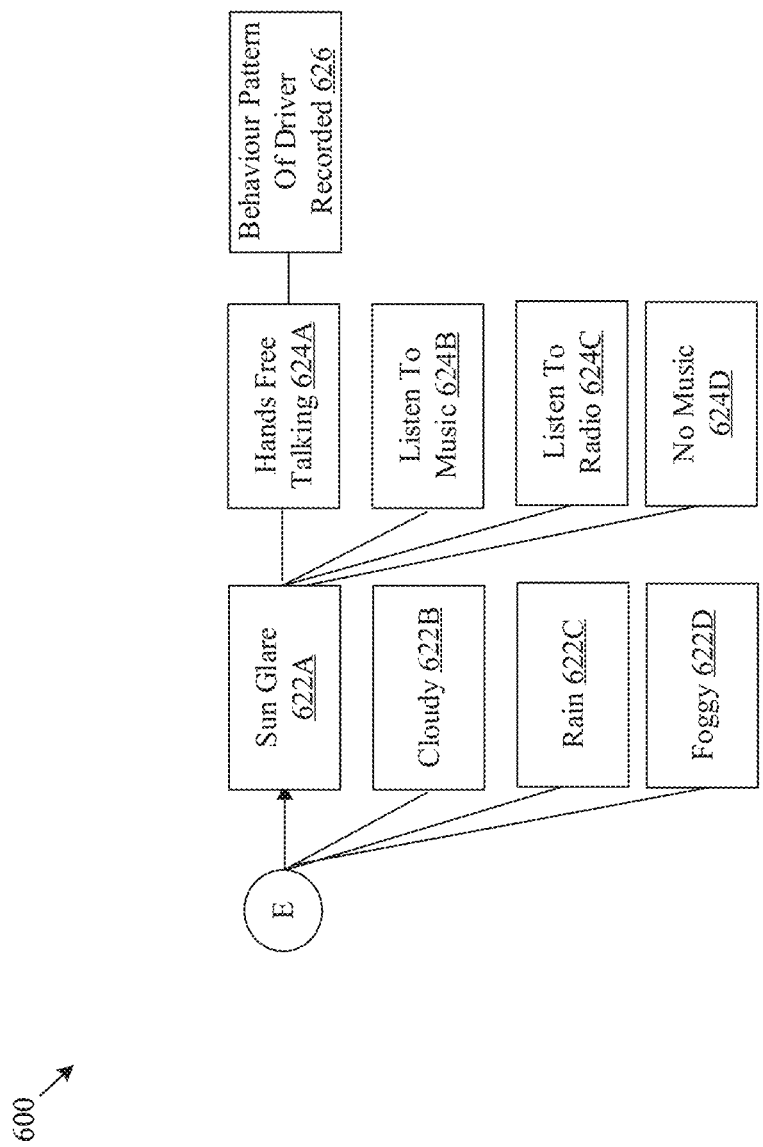

FIGS. 6A, 6B, and 6C, collectively, depict a diagram that illustrates an exemplary sequence of observations to be used for determination of a behavior pattern of a driver of a vehicle, in accordance with an embodiment of the disclosure. FIGS. 6A, 6B and 6C are explained in conjunction with elements from FIGS. 1, 2, 3A, 3B, 4A, 4B, and 5. With reference to FIGS. 6A, 6B and 6C, there is shown a diagram 600 that illustrates a sequence of observations after an event is detected, as described herein. Such observations may be collected by the system 102 and may be analyzed to determine a behavior pattern (as described in FIGS. 4A and 4B, for example) of the driver.

At any time-instant, the circuitry 202 or ADAS/AD may detect an event, such as an accident 602B or a near miss 602A in the environment. When there is the near miss 602A in the environment, the driver may take an action 604A or ADAS/AD 604B may take an action depending on the vehicle 502 (and vehicle features). In case of an incident, the driver may apply a brake 606A, adjust a steering wheel 606B, or may just honk 606C. The driver may apply the brake 606A in case a moving object gets close 608A, a still object gets closer 608B, or a still object gets more closer 608C. The object may a vehicle 610A, a pedestrian 610B, a motorcycle 610C, a bicycle 610D, a bus 610E, or an animal 610F. The movement of the object may be either towards a left 612A, a right 612B, a front 612C, or back 612D of the vehicle 502. Based on the intensity of the object movement, the driver may press or release an accelerator 614 in order to merge to a freeway 616A, drive towards a freeway location 616B, or to pass by an intersection 616C. The circuitry 202 may determine a type of traffic, whether it is a jam 618B, a slow traffic 618C, or a no traffic 618D. A time of day (such as evening 620A, morning 620B, night 620C, and daytime 620D) may be recorded on the system 102 at the time the event is detected. If it is evening, then it may be determined whether there is a sun glare 622A, or it is either cloudy 622B, raining 622C, or foggy 622D. If there is a sun glare in the evening, it may be determined whether the driver is having a handsfree talk 624A, is listening to music 626B or radio 626C, or is listening to no music 626D. At 628, the sequence of observations from 602A to 626D may be recorded on the system 102. The circuitry 202 analyze the recorded sequence of observations to determine a behavioral pattern of the driver and to assist the system 102 to control one or more operations of the vehicle based on the behavioral pattern.

Figure 7A:
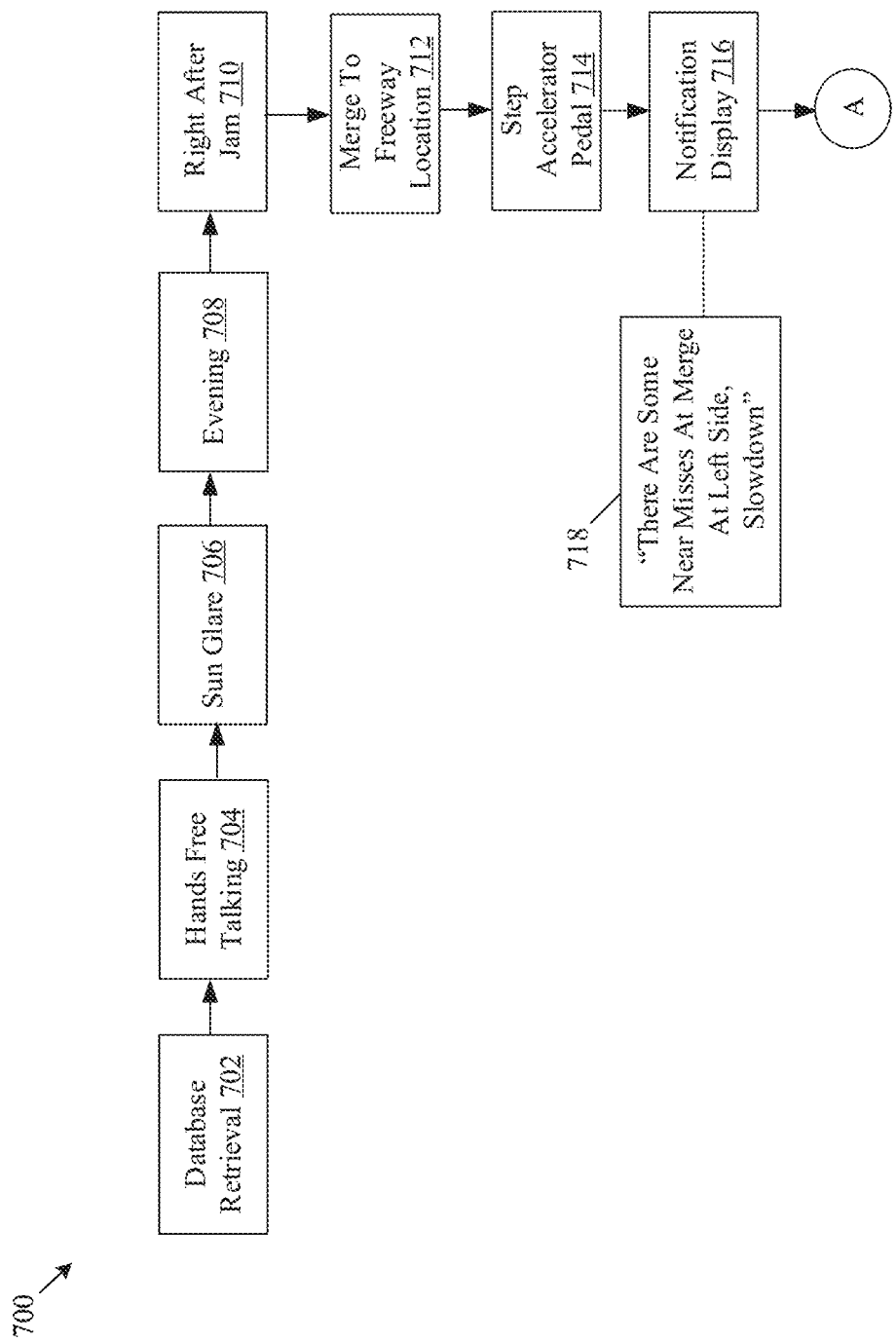
FIGS. 7A and 7B, collectively, depict is a diagram that illustrates an exemplary scenario for generation of notification information based on a behavior pattern of a driver, in accordance with an embodiment of the disclosure.
Figure 7B:
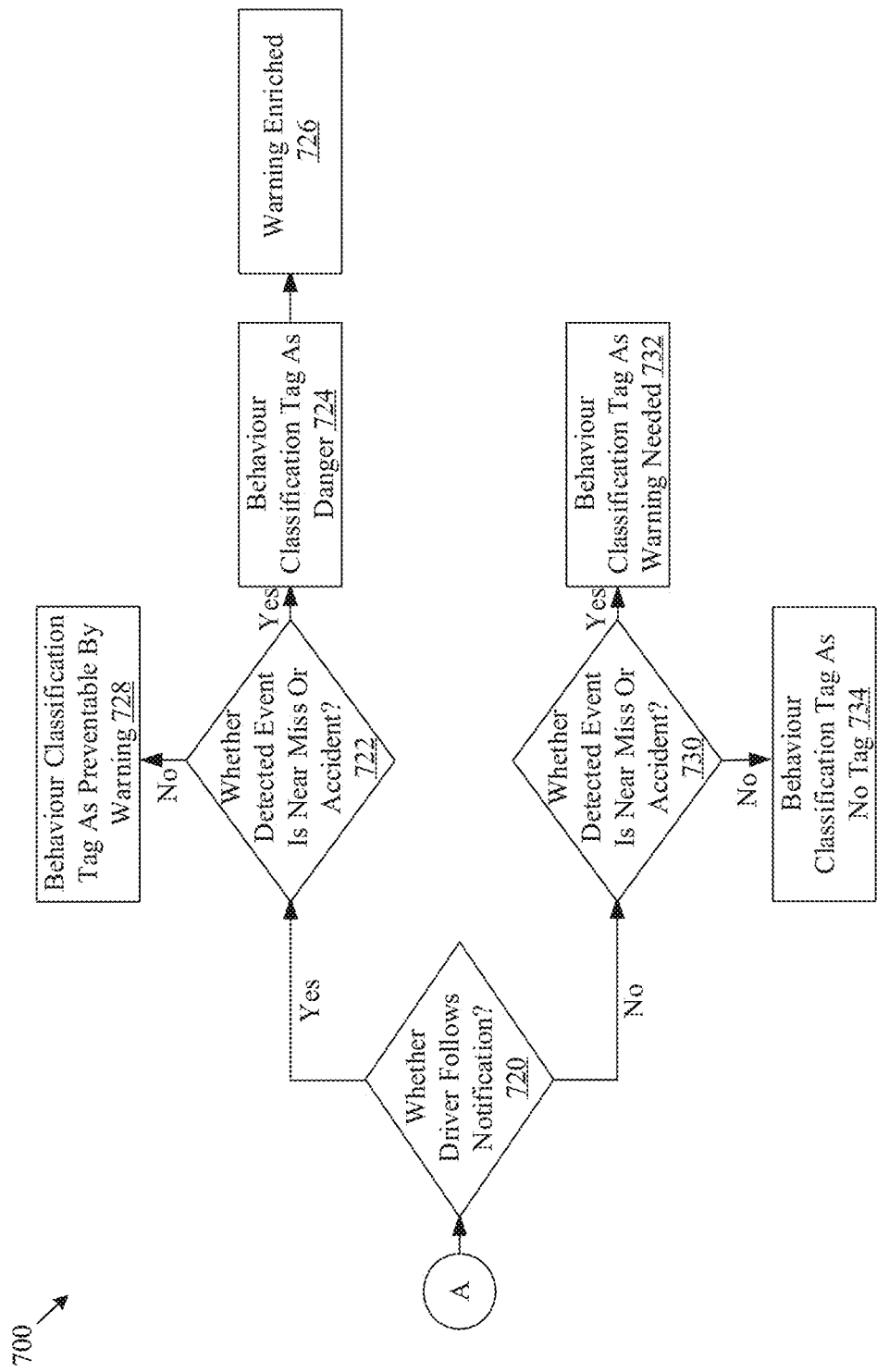

FIGS. 7A and 7B, collectively, depict a diagram that illustrates an exemplary scenario for generation of notification information based on a behavior pattern of a driver, in accordance with an embodiment of the disclosure. FIGS. 7A and 7B, are explained in conjunction with elements from FIGS. 1, 2, 3A, 3B, 4A, 4B, 5, 6A, 6B, and 6C. With reference to FIGS. 7A and 7B, there is shown a diagram 700 that illustrates exemplary operations 702 to 730, as described herein. The exemplary operations illustrated in the diagram 700 may start at 702 and may be performed by any computing system, apparatus, or device, such as, by the system 102 of FIG. 1 or FIG. 2.

At 702, a database may be retrieved. In an embodiment, the circuitry 202 may retrieve a database associated with a driver of the vehicle. The database may be retrieved from a server (such as the server 106) or a local storage device on the vehicle. Thereafter, the circuitry 202 may analyze information which may be included in the retrieved database and may be associated with the in-vehicle environment. Also, the circuitry 202 may analyze scene information of an environment outside the vehicle. In an embodiment, such analysis may be further done based on classification of objects, included in the in-vehicle environment and the environment outside the vehicle.

At 704, the driver may be determined to be using a phone using a handsfree function while driving the vehicle. In an embodiment, the circuitry 202 may determine that the driver is using the phone while driving, based on the analysis of the scene information and the information associated with the in-vehicle environment.

The circuitry 202 may record a sequence of observations based on the analysis of the scene information and the information associated with the in-vehicle environment. For example, the sequence of observations may include an environmental condition (such as sun glare 706), a time of day (such as evening 708), an act to merge to a freeway location (at 712) right after a jam (at 710), an act of pressing a pedal (at 714). Based on such observations and the determination that the driver may be using the phone, the circuitry 202 may control an electronic device (such as a vehicle display or a user device) to display a notification 716, which may include a message 718, as "there are some near misses at merge at left side, slowdown".

In an embodiment, the circuitry 202 may be further configured to transmit the notification 716 to the electronic device. The notification 716 may include, but is not limited to, an audible signal, or a visual signal, or any other notification signal. In an example, the notification 716 may be a voice signal including an audible message, such as "grab the steering wheel". In another example, the notification 716 may be a visual signal, such as a marking on a potential near miss area on a map and/or a camera see through.

At 720, it may be determined whether the driver follows the displayed notification 716. In an embodiment, the circuitry 202 may be configured to determine whether or not the driver follows the displayed notification 716. For instance, the circuitry 202 may match an action taken by the driver and an action suggested in the displayed notification 716. If both the actions match, then the control may pass to 722. Otherwise, control may pass to 730.

At 722, it may be determined whether the detected event (for example, in FIG. 6A) is a near miss or an accident. In an embodiment, the circuitry 202 may detect the event as the near miss or accident in the environment. In an embodiment, the circuitry 202 may determine, for the behavior pattern of the driver, the behavior classification tags based on the detected event (such as the near miss or the accident and the action taken by the driver with respect to the detected event). The determined behavior classification tags may correspond to behavior patterns, which may include a set of actions, observations, or judgements related to the driver or the vehicle and may be recorded around the time the event is detected.

In an instance where the driver doesn't follow the displayed notification 716 and the event (such as the accident or near miss in the environment) is detected, the circuitry 202 may determine the behavior classification tag for the driver as "danger" 724. The behavior classification tag, such as danger 724, may imply that the driver did not follow the displayed notification 716 and therefore, took a risk while driving. For such a classification tag, the circuitry 202 may enrich a warning that may be issued to the driver. For example, the warning may include specific penalties, charges, and/or rewards related to at least one of insurance claims, rent-a-car costs, a driver or pilot license renewal system, a truck and taxi including a passenger drone driver, or a pilot hierarchy system. The warning may also include specific instructions to avoid such events in future.

In another instance where the driver follows the displayed notification 716 and the event (such as the accident or near miss in the environment) is detected, the circuitry 202 may determine the behavior classification tag for the behavior pattern of the driver as "preventable by warning" 728.

At 730, it may be determined whether the detected event (for example, in FIG. 6A) is a near miss or an accident. In an embodiment, the circuitry 202 may detect the event as a near miss or accident in the environment. In an instance where the driver doesn't follow the displayed notification 716 and the event (such as the accident or near miss in the environment) is detected, the circuitry 202 may determine the behavior classification tag for the behavior pattern of the driver as "warning is needed" 732. In another instance where the driver doesn't follow the displayed notification 716 and the event (such as the accident or near miss in the environment) is not detected, the circuitry 202 may determine the behavior classification tag for the behavior pattern of the driver as "no tag" 734.

Figure 8:
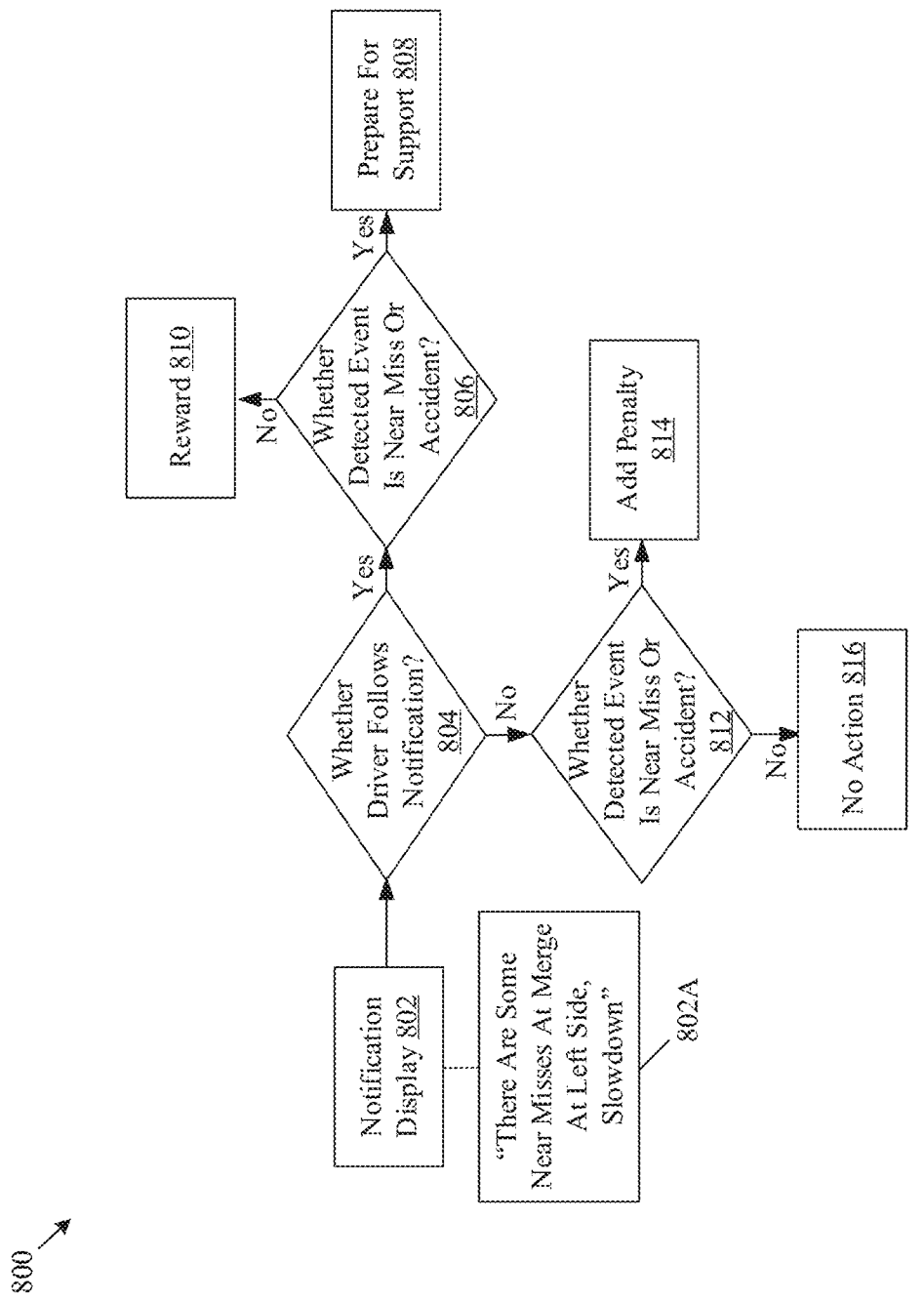
FIG. 8 is a diagram that illustrates an exemplary scenario for generation of notification information based on a behavior pattern of a driver, in accordance with an embodiment of the disclosure.

FIG. 8 is a diagram that illustrates an exemplary scenario for generation of notification information based on a behavior pattern of a driver, in accordance with an embodiment of the disclosure. FIG. 8 is explained in conjunction with elements from FIGS. 1, 2, 3A, 3B, 4A, 4B, 5, 6A, 6B, 6C, 7A, and 7B. With reference to FIG. 8, there is shown a diagram 800 that illustrates exemplary operations from 802 to 812, as described herein. The exemplary operations illustrated in the diagram 800 may start at 802 and may be performed by any computing system, apparatus, or device, such as the system 102 of FIG. 1 or FIG. 2.

At 802, a notification may be displayed. In an embodiment, the circuitry 202 may be configured to display a notification based on the analysis of the scene information and the information associated with the in-vehicle environment. The notification may include a message 802A, such as "there are some near misses at merge at left side, slowdown".

In an embodiment, the circuitry 202 may evaluate a behavior pattern of the driver based on the determined the behavior classification tags (as also described in FIGS. 4A, 4B, 6A, 6B, and 6C). The evaluation may include recognitions, such as rewards and/or punishments for the behavior pattern of the driver.

At 804, it may be determined whether the driver follows the displayed notification. In an embodiment, the circuitry 202 may be configured to determine whether or not the driver follows the displayed notification. For instance, the circuitry 202 may match an action taken by the driver and an action suggested in the displayed notification. If both the actions match, then control may pass to 806. Otherwise, control may pass to 812.

At 806, it may be determined whether the detected event (for example, in FIG. 6A) is a near miss or an accident. In an instance where the driver follows the displayed notification and the event (such as the accident or near miss in the environment) is detected, the circuitry 202 may evaluate that a valid support 808 (such as a reason for such a behavior) for the behavior pattern of the driver. Such evaluation may be helpful for insurance services to provide accurate and more reliable judgements for insurance claims. In another instance where the driver follows the displayed notification, and the event (such as the accident or near miss in the environment) is not detected, the circuitry 202 may evaluate that a reward 810 (such as a discount or reward points) should be added for the behavior of the driver.

At 812, it may be determined whether the detected event (for example, in FIG. 6A) is a near miss or an accident. In an embodiment, the circuitry 202 may detect the event as near miss or accident in the environment. In an instance where the driver doesn't follow the displayed notification, and the event such as the accident or near miss in the environment is detected, the circuitry 202 may evaluate that a penalty 814 (such as a punishment or fine) should be added to insurance claims or charges for the vehicle. In another instance where the driver doesn't follow the displayed notification, and the event (such as the accident or near miss in the environment) is not detected, the circuitry 202 may evaluate that no action 816 is needed.

Figure 9:
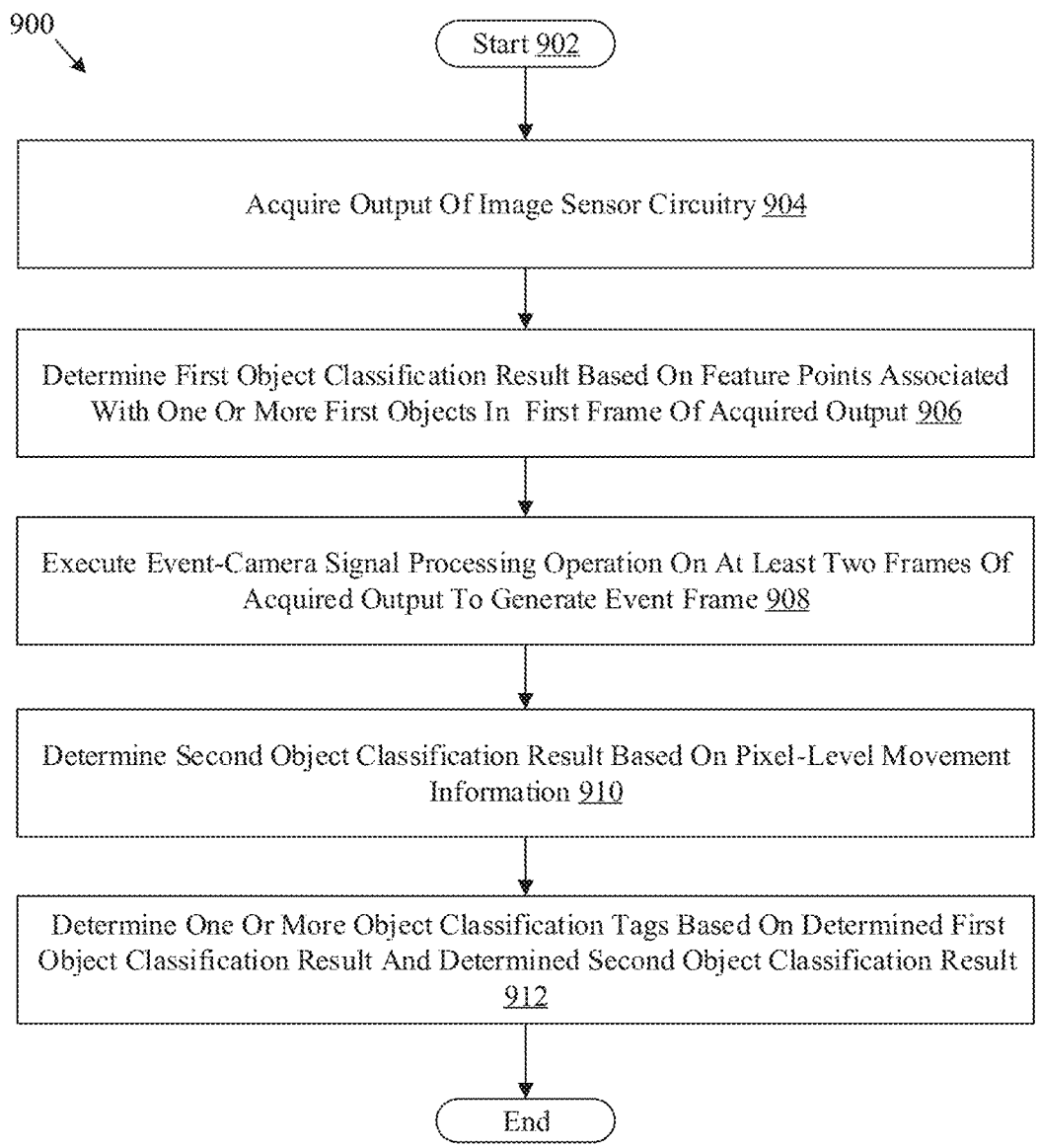
FIG. 9 is a flowchart that illustrates an exemplary method for object classification based on frame and event camera processing, in accordance with an embodiment of the disclosure.

FIG. 9 is a flowchart that illustrates an exemplary method for object classification based on frame and event camera processing, in accordance with an embodiment of the disclosure. FIG. 9 is explained in conjunction with elements from FIGS. 1, 2, 3A, 3B, 4A, 4B, 5, 6A, 6B, 6C, 7, and 8. With reference to FIG. 9, there is shown a flowchart 900. The operations of the flowchart 900 may be executed by a computing system, such as the system 102, or the circuitry 202. The operations may start at 902 and proceed to 904.

At 904, an output of image sensor circuitry 104 may be acquired. In one or more embodiments, the circuitry 202 may be configured to acquire the output of image sensor circuitry. Details of the acquisition are described, for example, in FIGS. 3A and 3B.

At 906, a first object classification result may be determined. In one or more embodiments, the circuitry 202 may be configured to determine the first object classification result based on feature points associated with one or more first objects in a first frame of the acquired output. Details of determination of the first object classification result are described, for example, in FIGS. 3A and 3B.

At 908, an event-camera signal processing operation may be executed. In one or more embodiments, the circuitry 202 may be configured to execute the event-camera signal processing operation on at least two frames of the acquired output to generate an event frame. The generated event frame may include pixel-level movement information associated with one or more second objects. Details of the execution of the event-camera signal processing operation are described, for example, in FIGS. 3A and 3B.

At 910, a second object classification result may be determined. In one or more embodiments, the circuitry 202 may be configured to determine the second object classification result based on the pixel-level movement information, as described, for example, in FIGS. 3A and 3B.

At 912, one or more object classification tags may be determined. In one or more embodiments, the circuitry 202 may be configured determine one or more object classification tags based on the determined first object classification result and the determined second object classification result. The determined one or more object classification tags may correspond to one or more objects, included in at least the one or more first objects and the one or more second objects. Details of the determination of one or more object classification tags are described, for example, in FIGS. 3A and 3B. Control may pass to end.

Although the flowchart 900 is illustrated as discrete operations, such as 904, 906, 908, 910, and 912, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, computer-executable instructions executable by a machine and/or a computer (for example, the system 102). The computer-executable instructions may cause the machine and/or computer (for example, the system 102) to perform operations may further include determination of a first object classification result based on feature points associated with one or more first objects in a first frame of the acquired output. The operations may further include execution of an event-camera signal processing operation on at least two frames of the acquired output to generate an event frame. The generated event frame may include pixel-level movement information associated with one or more second objects. The operations may further include determination of a second object classification result based on the pixel-level movement information. The operations may further include determination of one or more object classification tags based on the determined first object classification result and the determined second object classification result. The determined one or more object classification tags may correspond to one or more objects included in at least the one or more first objects and the one or more second objects.

Exemplary aspects of the disclosure may include a system (such as the system 102) that may include circuitry (such as the circuitry 202). The circuitry 202 may be configured to acquire an output of image sensor circuitry. The circuitry 202 may be configured to determine a first object classification result based on feature points associated with one or more first objects in a first frame of the acquired output. The circuitry 202 may be configured to execute an event-camera signal processing operation on at least two frames of the acquired output to generate an event frame. The generated event frame may include pixel-level movement information associated with one or more second objects. The circuitry 202 may be configured to determine a second object classification result based on the pixel-level movement information. The circuitry 202 may be configured to determine one or more object classification tags based on the determined first object classification result and the determined second object classification result. The determined one or more object classification tags may correspond to one or more objects included in at least the one or more first objects and the one or more second objects.

In accordance with an embodiment, the one or more first objects may be in a stationary state or are about to reach a stationary state, and the one or more second objects are in motion.

In accordance with an embodiment, the circuitry 202 may be further configured to detect the feature points in the first frame of the acquired output. The circuitry 202 may be further configured to determine a first pattern match between the detected feature points with first reference features associated with known object classes. The first object classification result may be determined based on the determined first pattern match.

In accordance with an embodiment, the circuitry 202 may be further configured to determine the second object classification result based on pattern matching the pixel-level movement information with second reference features associated with known object classes.

In accordance with an embodiment, the first object classification result may include the first frame overlaid with first bounding box information associated with the one or more first objects, and the second object classification result may include the event frame overlaid with second bounding box information associated with the one or more second objects.

In accordance with an embodiment, the circuitry 202 may be further configured to determine a difference between the determined first object classification result and the determined second object classification result. Thereafter, the circuitry 202 may be further configured to determine, from the one or more first objects or the one or more second objects, a first object which is either misclassified, unclassified, detected but unclassified, mis-detected, or mis-detected and mis-classified, wherein the first object is determined based on the difference.

In accordance with an embodiment, the circuitry 202 may be further configured to execute a pattern matching operation for the determined first object based on the determined difference, the determined first object classification result, and the determined second object classification result. The circuitry 202 may classify the determined first object into a first object class based on the execution of the pattern matching operation.

In accordance with an embodiment, the circuitry 202 may be further configured to determine, for the first object, a first object classification tag of the one or more object classification tags based on a determination that the first object class is correct.

In accordance with an embodiment, the pattern matching operation may be a machine learning-based pattern matching operation or a deep learning-based pattern matching operation.

In accordance with an embodiment, the circuitry 202 may be further configured to transmit the event frame or the first frame to a server, based on a determination that the first object class is incorrect. The circuitry 202 may be further configured to receive a second object class for the determined first object from the server based on the transmission. The circuitry 202 may be further configured to determine, for the first object, a first object classification tag of the one or more object classification tags based on a determination that the second object class is correct.

In accordance with an embodiment, each of the first frame and the event frame capture scene information of an environment outside a vehicle.

In accordance with an embodiment, the circuitry 202 may be further configured to control an electronic control system of the vehicle to detect an event comprising an accident or a near miss in the environment. The circuitry 202 may be further configured to determine a behavior pattern of a driver of the vehicle based on the determined one or more object classification tags and the detected event.

In accordance with an embodiment, the electronic control system may be one of Advanced Driver Assistance System (ADAS) and Autonomous Driving (AD) system.

In accordance with an embodiment, the circuitry 202 may be further configured to control one or more operations of the vehicle based on the determined behavior pattern.

In accordance with an embodiment, the circuitry 202 may be further configured to generate notification information based on the determined behavior pattern. The circuitry 202 may be further configured to transmit the generated notification information to an electronic device which is associated with the vehicle or the driver of the vehicle.

In accordance with an embodiment, the circuitry 202 may be further configured to control, inside a vehicle, an image projecting device to project an image of a user interface (UI) onto a projection surface inside the vehicle. Each of the first frame and the event frame may capture scene information of an in-vehicle environment inside the vehicle. The circuitry 202 may be further configured to detect a finger movement over a virtual UI element of the UI included in the projected image, based on a second object classification tag of the determined one or more object classification tags. The circuitry 202 may be further configured to select the virtual UI element based on the detection and control one or more vehicle functions based on the selection.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A system, comprising:
    circuitry configured to:
    acquire an output of image sensor circuitry;
    determine a first object classification result based on feature points associated with one or more first objects in a first frame of the acquired output;
    execute an event-camera signal processing operation on at least two frames of the acquired output to generate an event frame, wherein
        the generated event frame comprises pixel-level movement information associated with one or more second objects;
    determine a second object classification result based on the pixel-level movement information;
    determine whether there is a difference between the determined first object classification result and the determined second object classification result;
    determine one or more object classification tags based on the determination that there is no difference between the determined first object classification result and the determined second object classification result, wherein
        the determined one or more object classification tags correspond to one or more objects included in at least the one or more first objects and the one or more second objects;
    determine, based on the determination that there is the difference between the determined first object classification result and the determined second object classification result, an errored object from one of the one or more first objects or the one or more second objects, wherein
        the determined errored object is one of misclassified, unclassified, detected but unclassified, mis-detected, or mis-detected and mis-classified;
    execute a pattern matching operation for the determined errored object based on the determined difference, the determined first object classification result, and the determined second object classification result; and
    classify the determined errored object into a first object class based on the execution of the pattern matching operation.

2. The system according to claim 1, wherein
    the one or more first objects are in one of a stationary state or are about to reach the stationary state, and
    the one or more second objects are in motion.

3. The system according to claim 1, wherein the circuitry is further configured to:
    detect the feature points in the first frame of the acquired output; and
    determine a first pattern match between the detected feature points with first reference features associated with known object classes, wherein
        the first object classification result is determined based on the determined first pattern match.

4. The system according to claim 1, wherein the circuitry is further configured to determine the second object classification result based on pattern matching the pixel-level movement information with second reference features associated with known object classes.

5. The system according to claim 1, wherein
    the first object classification result comprises the first frame overlaid with first bounding box information associated with the one or more first objects, and
    the second object classification result comprises the event frame overlaid with second bounding box information associated with the one or more second objects.

6. The system according to claim 1, wherein the circuitry is further configured to determine, for the errored object, a first object classification tag of the one or more object classification tags based on a determination that the first object class is correct.

7. The system according to claim 1, wherein the pattern matching operation is one of a machine learning-based pattern matching operation or a deep learning-based pattern matching operation.

8. The system according to claim 1, wherein the circuitry is further configured to:
    transmit one of the event frame or the first frame to a server, based on a determination that the first object class is incorrect;
    receive a second object class for the determined errored object from the server based on the transmission; and
    determine, for the errored object, a first object classification tag of the one or more object classification tags based on a determination that the second object class is correct.

9. The system according to claim 1, wherein each of the first frame and the event frame capture scene information of an environment outside a vehicle.

10. The system according to claim 9, wherein the circuitry is further configured to:
    control an electronic control system of the vehicle to detect an event comprising one of an accident or a near miss in the environment; and
    determine a behavior pattern of a driver of the vehicle based on the determined one or more object classification tags and the detected event.

11. The system according to claim 10, wherein the electronic control system is one of Advanced Driver Assistance System (ADAS) or Autonomous Driving (AD) system.

12. The system according to claim 10, wherein the circuitry is further configured to control one or more operations of the vehicle based on the determined behavior pattern.

13. The system according to claim 10, wherein the circuitry is further configured to:
    generate notification information based on the determined behavior pattern; and
    transmit the generated notification information to an electronic device which is associated with one of the vehicle or the driver of the vehicle.

14. The system according to claim 1, wherein the circuitry is further configured to:
    control, inside a vehicle, an image projecting device to project an image of a user interface (UI) onto a projection surface inside the vehicle, wherein each of the first frame and the event frame capture scene information of an in-vehicle environment inside the vehicle;

detect a finger movement over a virtual UI element of the UI included in the projected image, based on a second object classification tag of the determined one or more object classification tags;

select the virtual UI element based on the detection; and control one or more vehicle functions based on the selection.

15. A method, comprising:

acquiring an output of image sensor circuitry;

determining a first object classification result based on feature points associated with one or more first objects in a first frame of the acquired output;

executing an event-camera signal processing operation on at least two frames of the acquired output to generate an event frame, wherein
the generated event frame comprises pixel-level movement information associated with one or more second objects;

determining a second object classification result based on the pixel-level movement information;

determining whether there is a difference between the determined first object classification result and the determined second object classification result;

determining one or more object classification tags based on the determination that there is no difference between the determined first object classification result and the determined second object classification result, wherein
the determined one or more object classification tags correspond to one or more objects included in at least the one or more first objects and the one or more second objects;

determining, based on the determination that there is the difference between the determined first object classification result and the determined second object classification result, an errored object from one of the one or more first objects or the one or more second objects, wherein
the determined errored object is one of misclassified, unclassified, detected but unclassified, mis-detected, or mis-detected and mis-classified;

executing a pattern matching operation for the determined errored object based on the determined difference, the determined first object classification result, and the determined second object classification result; and classifying the determined errored object into a first object class based on the execution of the pattern matching operation.

16. The method according to claim 15, further comprising:

detecting the feature points in the first frame of the acquired output; and determining a first pattern match between the detected feature points with first reference features associated with known object classes, wherein
the first object classification result is determined based on the determined first pattern match.

17. The method according to claim 15, further comprising determining the second object classification result based on pattern matching the pixel-level movement information with second reference features associated with known object classes.

18. A non-transitory computer-readable medium having stored thereon, computer-executable instructions that when executed by a system, causes the system to execute operations, the operations comprising:

acquiring an output of image sensor circuitry;

determining a first object classification result based on feature points associated with one or more first objects in a first frame of the acquired output;

executing an event-camera signal processing operation on at least two frames of the acquired output to generate an event frame, wherein
the generated event frame comprises pixel-level movement information associated with one or more second objects;

determining a second object classification result based on the pixel-level movement information;

determining whether there is a difference between the determined first object classification result and the determined second object classification result;

determining one or more object classification tags based on the determination that there is no difference between the determined first object classification result and the determined second object classification result, wherein
the determined one or more object classification tags correspond to one or more objects included in at least the one or more first objects and the one or more second objects;

determining, based on the determination that there is the difference between the determined first object classification result and the determined second object classification result, an errored object from one of the one or more first objects or the one or more second objects, wherein
the determined errored object is one of misclassified, unclassified, detected but unclassified, mis-detected, or mis-detected and mis-classified;

executing a pattern matching operation for the determined errored object based on the determined difference, the determined first object classification result, and the determined second object classification result; and classifying the determined errored object into a first object class based on the execution of the pattern matching operation.

* * * * *